(12) United States Patent
Yamamoto et al.

(10) Patent No.: US 8,448,035 B2
(45) Date of Patent: May 21, 2013

(54) COMMUNICATION SYSTEM ADAPTING FOR CAR, COMMUNICATION APPARATUS ADAPTING FOR CAR, AND COMMUNICATION METHOD ADAPTING FOR CAR

(75) Inventors: Hideki Yamamoto, Yokkaichi (JP); Ryo Kurachi, Nagoya (JP); Hiroaki Takada, Nagoya (JP)

(73) Assignees: National University Corporation Nagoya University, Nagoya (JP); Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 803 days.

(21) Appl. No.: 12/451,220

(22) PCT Filed: Jun. 6, 2008

(86) PCT No.: PCT/JP2008/060423
§ 371 (c)(1),
(2), (4) Date: Dec. 1, 2009

(87) PCT Pub. No.: WO2008/149967
PCT Pub. Date: Dec. 11, 2008

(65) Prior Publication Data
US 2010/0131816 A1 May 27, 2010

(30) Foreign Application Priority Data

Jun. 8, 2007 (JP) .................................. 2007-153298

(51) Int. Cl.
*H04L 1/16* (2006.01)
(52) U.S. Cl.
USPC ........................................................ 714/748

(58) Field of Classification Search
USPC .................................................. 714/748, 749
See application file for complete search history.

(56) References Cited

U.S. PATENT DOCUMENTS

| 4,644,534 A | 2/1987 | Sperlich |
| 5,928,294 A | 7/1999 | Zelinkovsky |

(Continued)

FOREIGN PATENT DOCUMENTS

| JP | A-62-7235 | 1/1987 |
| JP | A 4-310031 | 11/1992 |

(Continued)

OTHER PUBLICATIONS

"Road vehicles—Controller area network (CAN)—Part 1: Data link layer and physical signaling," *International Standard*, ISO-11898-1, Dec. 1, 2003, pp. 1-45.

(Continued)

*Primary Examiner* — Stephen M Baker
(74) *Attorney, Agent, or Firm* — Oliff & Berridge, PLC

(57) ABSTRACT

It is provided about a communication system mountable on a car, communication apparatus mountable on a car and a communication method mountable on a car that can perform data transmission under extensive range from a low speed communication to high speed communication, without generating data delay, data dropout and the like, caused by the data sending collision. A gateway and an ECU are connected to each other, in a one-to-one manner, via a communication line different from another communication line for another connection. When receiving a message, the gateway and the ECU reply a receipt response. When having a message to be sent toward the destination for replying at this replying time, the gateway and the ECU sends the receipt response onto which this message to be sent is added. When a message sending collision is generated, the gateway preferentially performs a message re-sending operation.

9 Claims, 24 Drawing Sheets

U.S. PATENT DOCUMENTS

| | | | |
|---|---|---|---|
| 6,778,509 B1 * | 8/2004 | Ravishankar et al. | 370/322 |
| 6,807,154 B1 * | 10/2004 | Malmgren et al. | 370/252 |
| 6,965,933 B2 * | 11/2005 | Haartsen | 709/223 |
| 7,706,408 B2 * | 4/2010 | Takagi et al. | 370/473 |
| 7,796,545 B2 * | 9/2010 | Surineni et al. | 370/278 |
| 2006/0092871 A1 | 5/2006 | Nishibayashi et al. | |
| 2010/0189056 A1 | 7/2010 | Nishibayashi et al. | |

FOREIGN PATENT DOCUMENTS

| | | |
|---|---|---|
| JP | A-04-313933 | 11/1992 |
| JP | A-08-163128 | 6/1996 |
| JP | A-09-181759 | 7/1997 |
| JP | A-09-508728 | 9/1997 |
| JP | A 2001-16209 | 1/2001 |
| JP | A-2001-251332 | 9/2001 |
| JP | A-2001-257696 | 9/2001 |
| JP | A-2001-268093 | 9/2001 |
| JP | A 2004-260484 | 9/2004 |
| JP | A 2005-124057 | 5/2005 |
| JP | A-2005-210210 | 8/2005 |
| JP | A-2006-129393 | 5/2006 |
| JP | A 2006-148580 | 6/2006 |
| JP | A-2006-246539 | 9/2006 |
| JP | A 2007-96902 | 4/2007 |
| JP | A-2007-129467 | 5/2007 |
| JP | A-2007-135011 | 5/2007 |

OTHER PUBLICATIONS

"Road vehicles—Low-speed serial data communication—Part 1: General and definitions," *International Standard*, ISO 11519-1, Jun. 15, 1994, pp. 1-4.

Search Report issued for International Application No. PCT/JP2008/060423 on Jul. 29, 2008.

Office Action issued in Japanese Patent Application No. 2007-153298 dated Dec. 13, 2011 (with translation).

Office Action issued in Japanese Patent Application No. 2007-153298 dated Aug. 9, 2011 (with translation).

* cited by examiner

F I G. 1
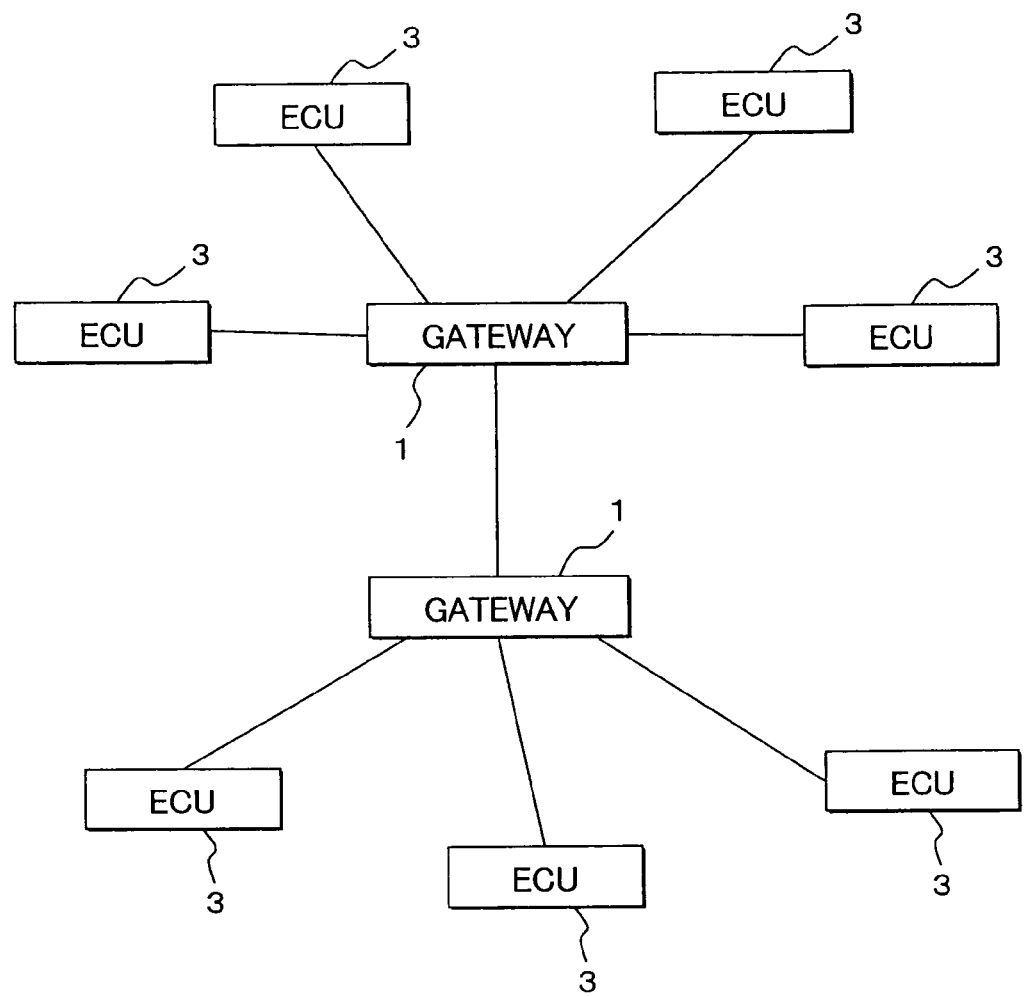

F I G. 4

TABLE OF FRAMES

| FRAME NAME | FUNCTION |
| --- | --- |
| DATA FRAME | FRAME FOR SENDING MESSAGE FROM SENDING UNIT |
| REMOTE FRAME | FRAME FOR REQUESTING FROM RECEIVING UNIT TO SEND MESSAGE HAVING SAME ID |
| ACK FRAME | FRAME FOR REPLYING WITH RESPECT TO RECEIVED DATA FRAME |
| INTER FRAME SPACE | BIT FIELD FOR SEPARATING DATA FRAME, REMOTE FRAME AND ACK FRAME FROM PREVIOUS FRAME |

F I G. 9

STATE-TRANSITION TABLE

| | PRESENT STATE | | EVENT | | FOLLOWING STATE |
|---|---|---|---|---|---|
| St11 | IDLE STATE | E11 | REQUEST OF SENDING | St12 | ACTIVE FRAME SENDING STATE |
| | | E12 | RECEIVE MESSAGE | St13 | ALTERNATE COMMUNICATION STATE |
| St12 | ACTIVE FRAME SENDING STATE | E13 | ESTABLISH TRANSMISSION | St13 | ALTERNATE COMMUNICATION STATE |
| St13 | ALTERNATE COMMUNICATION STATE | E14 | HAVE MESSAGE | St13 | ALTERNATE COMMUNICATION STATE |
| | | E15 | HAVE NO MESSAGE | St11 | IDLE STATE |
| | | E16 | BECOME BUS OFF STATE (TEC≧128 or REC≧128) | St14 | BUS OFF STATE |
| St14 | BUS OFF STATE | E17 | REVERSE (DETECT SEQUENTIAL RECESSIVES OF 11 BITS 128 TIMES) | St11 | IDLE STATE |

FIG. 20

STATE-TRANSITION TABLE

| PRESENT STATE | | EVENT | | FOLLOWING STATE | |
|---|---|---|---|---|---|
| St31 | RESET STATE | E31 | BE PROVIDED RESET CANCEL REQUEST | St34 | IDLE STATE |
| | | E32 | BE PROVIDED SLEEP REQUEST | St32 | SLEEP STATE |
| St32 | SLEEP STATE | E33 | BE PROVIDED SLEEP CANCEL REQUEST | St31 | RESET STATE |
| St33 | BUS OFF STATE | E34 | BE PROVIDED RESET REQUEST | St31 | RESET STATE |
| | | E35 | ESTABLISH REVERSION CONDITION | St34 | IDLE STATE |
| St34 | IDLE STATE | E36 | BE PROVIDED RESET REQUEST | St31 | RESET STATE |
| | | E37 | BE PROVIDED MESSAGE SENDING REQUEST | St35 | SENDING STATE 1 |
| | | E38 | RECEIVE MESSAGE | St41 | RECEIVING STATE |
| | | E39 | ESTABLISH BUS OFF STATE | St33 | BUS OFF STATE |
| St35 | SENDING STATE 1 | E40 | HAVE SENT MESSAGE | St36 | DOMINANT WAITING STATE 1 |
| St36 | DOMINANT WAITING STATE 1 | E41 | HAVE DOMINANT WITHIN 7 BITS | St37 | EOF WAITING STATE |
| | | E42 | HAVE DOMINANT WITHIN $tEOF + tIFS + 2\tau + \alpha$ | St41 | RECEIVING STATE |
| | | E43 | HAVE NO DOMINANT WITHIN $tEOF + tIFS + 2\tau + \alpha$ | St39 | SENDING STATE 2 |

FIG. 21

STATE-TRANSITION TABLE

| PRESENT STATE | | EVENT | | FOLLOWING STATE | |
|---|---|---|---|---|---|
| St37 | EOF WAITING STATE | E44 | PASS EOF PERIOD | St38 | IFS DELAY STATE 1 |
| St38 | IFS DELAY STATE 1 | E45 | PASS IFS PERIOD | St39 | SENDING STATE 2 |
| St39 | SENDING STATE 2 | E46 | COMPLETE SENDING (WITH REMAINING MESSAGE) | St40 | DOMINANT WAITING STATE 2 |
| | | E47 | COMPLETE SENDING (WITH NO REMAINING MESSAGE) | St34 | IDLE STATE |
| St40 | DOMINANT WAITING STATE 2 | E48 | HAVE DOMINANT WITHIN 7 BITS | St37 | EOF WAITING STATE |
| | | E49 | HAVE DOMINANT WITHIN $tEOF + tIFS + 2\tau + \alpha$ | St41 | RECEIVING STATE |
| | | E50 | HAVE NO DOMINANT WITHIN $tEOF + tIFS + 2\tau + \alpha$ | St34 | IDLE STATE |
| St41 | RECEIVING STATE | E51 | COMPLETE MESSAGE RECEIVING OPERATION | St42 | IFS DELAY STATE 2 |
| St42 | IFS DELAY STATE 2 | E52 | PASS IFS PERIOD (WITH REQUIRED REPLY) | St39 | SENDING STATE 2 |
| | | E53 | PASS IFS PERIOD (WITH NO REQUIRED REPLY) | St34 | IDLE STATE |

FIG. 23

STATE-TRANSITION TABLE

| PRESENT STATE | | EVENT | | FOLLOWING STATE | |
|---|---|---|---|---|---|
| St31 | RESET STATE | E31 | BE PROVIDED RESET CANCEL REQUEST | St34 | IDLE STATE |
| | | E32 | BE PROVIDED SLEEP REQUEST | St32 | SLEEP STATE |
| St32 | SLEEP STATE | E33 | BE PROVIDED SLEEP CANCEL REQUEST | St31 | RESET STATE |
| St33 | BUS OFF STATE | E34 | BE PROVIDED RESET REQUEST | St31 | RESET STATE |
| | | E35 | ESTABLISH REVERSION CONDITION | St34 | IDLE STATE |
| St34 | IDLE STATE | E36 | BE PROVIDED RESET REQUEST | St31 | RESET STATE |
| | | E37 | BE PROVIDED MESSAGE SENDING REQUEST | St35 | SENDING STATE 1 |
| | | E38 | RECEIVE MESSAGE | St41 | RECEIVING STATE |
| | | E39 | ESTABLISH BUS OFF STATE | St33 | BUS OFF STATE |
| St35 | SENDING STATE 1 | E40 | HAVE SENT MESSAGE | St36 | DOMINANT WAITING STATE 1 |
| St36 | DOMINANT WAITING STATE 1 | E41 | HAVE DOMINANT WITHIN 7 BITS | St37 | EOF WAITING STATE |
| | | E42 | HAVE DOMINANT WITHIN tEOF + tIFS + 4$\tau$ + 2$\alpha$ | St41 | RECEIVING STATE |
| | | E43 | HAVE NO DOMINANT WITHIN tEOF + tIFS + 4$\tau$ + 2$\alpha$ | St39 | SENDING STATE 2 |

FIG. 24

STATE-TRANSITION TABLE

| PRESENT STATE | | EVENT | | FOLLOWING STATE | |
|---|---|---|---|---|---|
| St37 | EOF WAITING STATE | E60 | PASS EOF PERIOD | St61 | RE-SENDING DOMINANT WAITING STATE |
| St39 | SENDING STATE 2 | E46 | COMPLETE SENDING (WITH REMAINING MESSAGE) | St40 | DOMINANT WAITING STATE 2 |
| | | E47 | COMPLETE SENDING (WITH NO REMAINING MESSAGE) | St34 | IDLE STATE |
| St40 | DOMINANT WAITING STATE 2 | E48 | HAVE DOMINANT WITHIN 7 BITS | St37 | EOF WAITING STATE |
| | | E49 | HAVE DOMINANT WITHIN tEOF + tIFS + $2\tau + \alpha$ | St41 | RECEIVING STATE |
| | | E50 | HAVE NO DOMINANT WITHIN tEOF + tIFS + $2\tau + \alpha$ | St34 | IDLE STATE |
| St41 | RECEIVING STATE | E51 | COMPLETE MESSAGE RECEIVING OPERATION | St42 | IFS DELAY STATE 2 |
| St42 | IFS DELAY STATE 2 | E52 | PASS IFS PERIOD (WITH REQUIRED REPLY) | St39 | SENDING STATE 2 |
| | | E53 | PASS IFS PERIOD (WITH NO REQUIRED REPLY) | St34 | IDLE STATE |
| St61 | RE-SENDING DOMINANT WAITING STATE | E61 | HAVE DOMINANT WITHIN tEOF + tIFS + $2\tau + 2\alpha$ | St41 | RECEIVING STATE |
| | | E62 | HAVE NO DOMINANT WITHIN tEOF + tIFS + $2\tau + 2\alpha$ | St39 | SENDING STATE 2 |

COMMUNICATION SYSTEM ADAPTING FOR CAR, COMMUNICATION APPARATUS ADAPTING FOR CAR, AND COMMUNICATION METHOD ADAPTING FOR CAR

This application is the national phase under 35 U.S.C. §371 of PCT International Application No. PCT/JP2008/060423 which has an International filing date of Jun. 6, 2008 and designated the United States of America.

BACKGROUND OF THE INVENTION

1. Field of the Invention

The present invention relates to a communication system mountable on a car, communication apparatus mountable on a car, and a communication method mountable on a car, which implements high speed data communication between respective apparatuses among a plurality of apparatuses mountable on a car.

2. Description of Related Art

Conventionally, several electronic devices are mounted on a car, which perform several operations. For controlling the performances of these electronic devices, several ECUs (electronic control units) are mounted on the car. Further, for working the several ECUs in cooperation, each ECU is connected to the other ECUs via a network and shares information with data transmission. To achieve these configurations, a CAN (controller area network) is well utilized as a communication protocol (see, non-patent document 1, and non-patent document 2).

Under the protocol of CAN, several ECUs are connected to a bus that is consisted of a twisted-pair cable to transfer an activation signal. Each ECU sends and receives digital data represented by the activation signal. Further, the CAN is a protocol for serial communication. Thus, only one ECU can perform data sending among several ECUs connected to a bus for CAN. Until the ECU completes the data sending, the other ECUs are controlled to wait. When some ECUs simultaneously perform data sending, arbitrating is performed on the basis of IDs applied to data and the highest priority data is controlled to be sent.

[non-patent document 1] ISO 11898-1: 2003 Road vehicles—Controller area network (CAN)—Part 1: Data link layer and physical signaling

[non-patent document 2] ISO 11519-1: 1994 Road vehicles—Low-speed serial data communication—Part 1: General and definitions

SUMMARY OF THE INVENTION

As a recent electronic control performed in car becomes increasingly sophisticated, the ECU mounted on the car is given to an enhanced functionality and more ECUs are mounted on the car. Thus, transmitted data amount is increased between the ECUs, and data transmission frequency is increased. As described above, a communication system mountable on a car with conventional CAN is configured to connect several ECUs with a bus. Thus, when many ECUs are connected with one bus, it happens to cause collision of data sending frequently and to keep low priority data in waiting condition for periods. Therefore, these configurations have problems to cause data delay, data dropout, and the like. A noticeable data delay and data dropout may lead fatal problems for auxiliary functions, such as brake control with using ECUs.

In view of such circumstances, a communication system mountable on a car is utilized recently that mounts several buses on a car each of which is connected to a few ECUs. In this configuration, several buses are connected through a gateway. This configuration reduces generation frequency of data sending collision at each bus and reduces occurrence of data delay, data dropout, and the like, because a few ECUs performs data transmission within each bus and data transmission between ECUs connected to different buses is performed through the gateway. However, the number of gateways mounted in a car is limited by the space confined within the car. That configuration cannot fundamentally resolve the problems described above, because the number of ECUs increases that are connected to each bus when the car mounts more ECUs.

In addition, the communication speed by a conventional CAN is limited approximately from several 100 Kbps to 1M bps. As described above, transmitted data amount is recently increased between the ECUs. Thus, it is required to perform high speed communication at 10 Mbps or the more. However, a communication cable has the characteristic that causes signal propagation delay about 5 ns by 1 m of cable length, while the ECUs mounted on the car are connected by communication cables. A bus configuring the CAN, as well as branch lines forked from the bus and reached to each ECU, is made from the communication cable. In a conventional car, the length of branch lines happens to reach 40 m, approximately. In this case, data transmission delay between each ECU corresponds to time for sending 2 bit data at 10 Mbps of communication speed, and further, the delay corresponds to time for sending 20 bit data at 100 Mbps of communication speed. Thus, the high speed communication by the conventional CAN has a problem that arbitrating is not performed correctly upon generating data sending collision because each ECU cannot work in cooperation.

The present invention was made in view of such circumstances, and has a primary object to provide a communication system mountable on a car, communication apparatus mountable on a car and a communication method mountable on a car that can perform data transmission extensively even under several 100 Kbps of low speed communication and even over 10 Mbps of high speed communication, without generating data delay, data dropout and the like, caused by the data sending collision.

A communication system mountable on a car according to first aspect of the present invention is mounted on a car and comprises a plurality of communication apparatuses mountable on a car that perform data transmission, wherein the communication apparatus mountable on a car comprises a means for sending a receipt response notifying receipt of data upon receiving the data to a sender that has sent the data, and, in the case that data to be sent to the sender exists, the data is applied to the receipt response and sent to the sender with the receipt response.

A communication system mountable on a car according to second aspect of the present invention has one communication apparatus mountable on a car connected to the other plural communication apparatuses mountable on a car with distinct communication lines.

A communication system mountable on a car according to third aspect of the present invention has the communication apparatus mountable on a car that comprises a determining means for determining whether collision is generated on the data sending through the communication line, and a means for re-sending the data after a predetermined waiting before sending period is passed in the case of generating the collision, wherein said one communication apparatus mountable on a car has a waiting before sending period shorter than a waiting before sending period of said other communication apparatus mountable on a car.

A communication system mountable on a car according to fourth aspect of the present invention has a predetermined determining period that starts after data sending is completed, wherein the determining means determines that the collision is generated in the case that the data being sent from the sender is received during the determining period after data sending is completed.

A communication system mountable on a car according to fifth aspect of the present invention has the communication apparatus mountable on a car that comprises a means for re-sending the data after passing a predetermined waiting before receiving period in the case that the receipt response sent from the sender which has sent the data is not received during a predetermined waiting before sending period after data sending is completed, wherein said one communication apparatus mountable on a car has a waiting before sending period shorter than a waiting before sending period of said other communication apparatus mountable on a car.

A communication system mountable on a car according to sixth aspect of the present invention has the receipt response that comprises information representing whether the applied data relates to re-sending or not.

A communication system mountable on a car according to seventh aspect of the present invention has the receipt response that comprises information representing whether an error is included in a received data or not.

A communication apparatus mountable on a car according to eighth aspect of the present invention is mounted on a car, performs data transmission, and comprises a means for sending a receipt response notifying receipt of data upon receiving the data to a sender that has sent the data, and, in the case that data to be sent to the sender exists, wherein the data is applied to the receipt response and sent to the sender with the receipt response.

A communication method mountable on a car according to ninth aspect of the present invention for performing data transmission between a plurality of communication apparatuses mountable on a car mounted on a car, utilizes one communication apparatus mountable on a car that is connected in advance to the other communication apparatuses mountable on a car with distinct communication lines, wherein, when the communication apparatus mountable on a car receives data, receipt response indicating the receipt of the data is sent to the sender that has sent the data, and, when data to be sent to the sender exists, the data is applied to the receipt response and sent to the sender with the receipt response.

In accordance with the aspect of the present invention, a communication apparatus mountable on a car, such as a gateway and an ECU, sends a receipt response to a sender that has sent data when receiving the data. Further, when the communication apparatus mountable on a car has data to be sent to the sender, this data is sent to the sender with the receipt response. Thus, it is possible to send both the receipt response and the data at a time. Therefore, the efficiency of data sending is improved.

Further, in accordance with the aspect of the present invention, one communication apparatus mountable on a car (gateway) is connected to other communication apparatuses mountable on a car (ECUs) with distinct communication lines. This configuration is so-called star topology network configuration. Thus, it is possible to make a gateway and an ECU perform one-to-one data transmission. Therefore, data sending by several ECUs do not cause collision (however, data sending by a gateway and an ECU may cause collision), and data sending of low priority data is not kept waiting for long period.

Further, in accordance with the aspect of the present invention, determination is performed whether data sending by a gateway and an ECU cause collision or not. When data sending by a gateway and an ECU cause collision, data is re-sent after passing a predetermined waiting before sending period. Thus, a gateway or an ECU that has determined to have a generation of collision can re-send data. Therefore, it is possible to reliably send data without data dropout. A waiting before sending period of gateway is set to be shorter than a waiting before sending period of ECU. Thus, re-sending of gateway is given preference when both communication apparatuses mountable on a car of gateway and ECU determine that data sending collision is generated. Therefore, re-sending of gateway and ECU do not cause collision again. Data of ECU can be sent together with a receipt response that is for data being re-sent from a gateway. Furthermore, a gateway that has received this receipt response and data can send a receipt response applied with data to an ECU upon sending the receipt response. Thus, it is possible to prevent continuous generation of collision, even when data sending collision is generated. Therefore, a gateway and an ECU can alternately send data without collision, until there is no data to be sent.

Further, in accordance with the aspect of the present invention, a period is set that is for determining after completing data sending and data receiving whether data collision is generated or not. This period includes a period of conventional CAN, such as EOF (end of frame) and IFS (inter frame space). When receiving data from the completion of data sending till the end of this period, a gateway and an ECU can determine that data sending collision is generated.

Further, in accordance with the aspect of the present invention, a predetermined waiting before receiving period is set that starts after the completion of data sending. A determination is performed whether data sending succeeds or fails, on the basis of reception of a receipt response sent from a data sender during this period. When data sending fails, data is re-sent after the predetermined waiting before sending period. When the waiting before sending period of gateway is set to be shorter than the waiting before sending period of ECU, it is possible to prevent collision from generating again at the time of data re-sending, as described above.

Further, in accordance with the aspect of the present invention, when a receipt response is applied with data and is sent, the receipt response includes information representing whether the applied data is for re-sending or not. Therefore, a gateway or an ECU receiving the receipt response can recognize that sending collision, communication disturbance or the like is generated before the receipt response has been sent.

Further, in accordance with the aspect of the present invention, determining is performed whether received data includes an error or not with using a technique, such as error-detecting technique. Then, the receipt response to be sent to the sender of this received data is supplied with the information representing the existence of error. Therefore, a gateway or an ECU receiving the receipt response can determines whether data re-sending should be performed or not.

The present invention can lead advantages which reduce generation frequency of collision caused by data sending and prevent data sending of low priority data from being kept waiting for long period, because two communication apparatuses mountable on a car can perform one-to-one data transmission with using configurations that one communication apparatus mountable on a car is connected to the other plural communication apparatuses mountable on a car with distinct communication lines. Furthermore, the present invention can lead advantages which improve the efficiency of data sending, because both a receipt response and data can be sent at a time with using configurations that a receipt response is sent to a sender of data when a communication apparatus mountable on a car receipts the data and that data to be sent to the sender is sent with the receipt response when the data to be sent exists. Thus, it is possible to implement more trusted high speed data communication without data delay, data dropout, and the like caused by the data sending collision. Therefore, it is possible to perform data transmission extensively even under several 100 Kbps of low speed communication and even over 10 Mbps of high speed communication.

The above and further objects and features of the invention will more fully be apparent from the following detailed description with accompanying drawings.

BRIEF DESCRIPTION OF THE DRAWINGS

FIG. 1 is a schematic view showing one example of configuration of communication system mountable on a car according to the present invention;

FIG. 4 is a table illustrating roles of frames and space utilized by the communication of the communication system mountable on a car according to the present invention;

FIG. 9 is a state-transition table illustrating the communication control of the communication system mountable on a car according to the present invention;

FIG. 20 is a state-transition table illustrating one example of detailed communication control of the gateway of the communication system mountable on a car according to the present invention;

FIG. 21 is a state-transition table illustrating one example of detailed communication control of the gateway of the communication system mountable on a car according to the present invention;

FIG. 23 is a state-transition table illustrating one example of detailed communication control of the ECU of the communication system mountable on a car according to the present invention;

FIG. 24 is a state-transition table illustrating one example of detailed communication control of the ECU of the communication system mountable on a car according to the present invention;

DESCRIPTION OF THE PREFERRED EMBODIMENT

Figure 2:
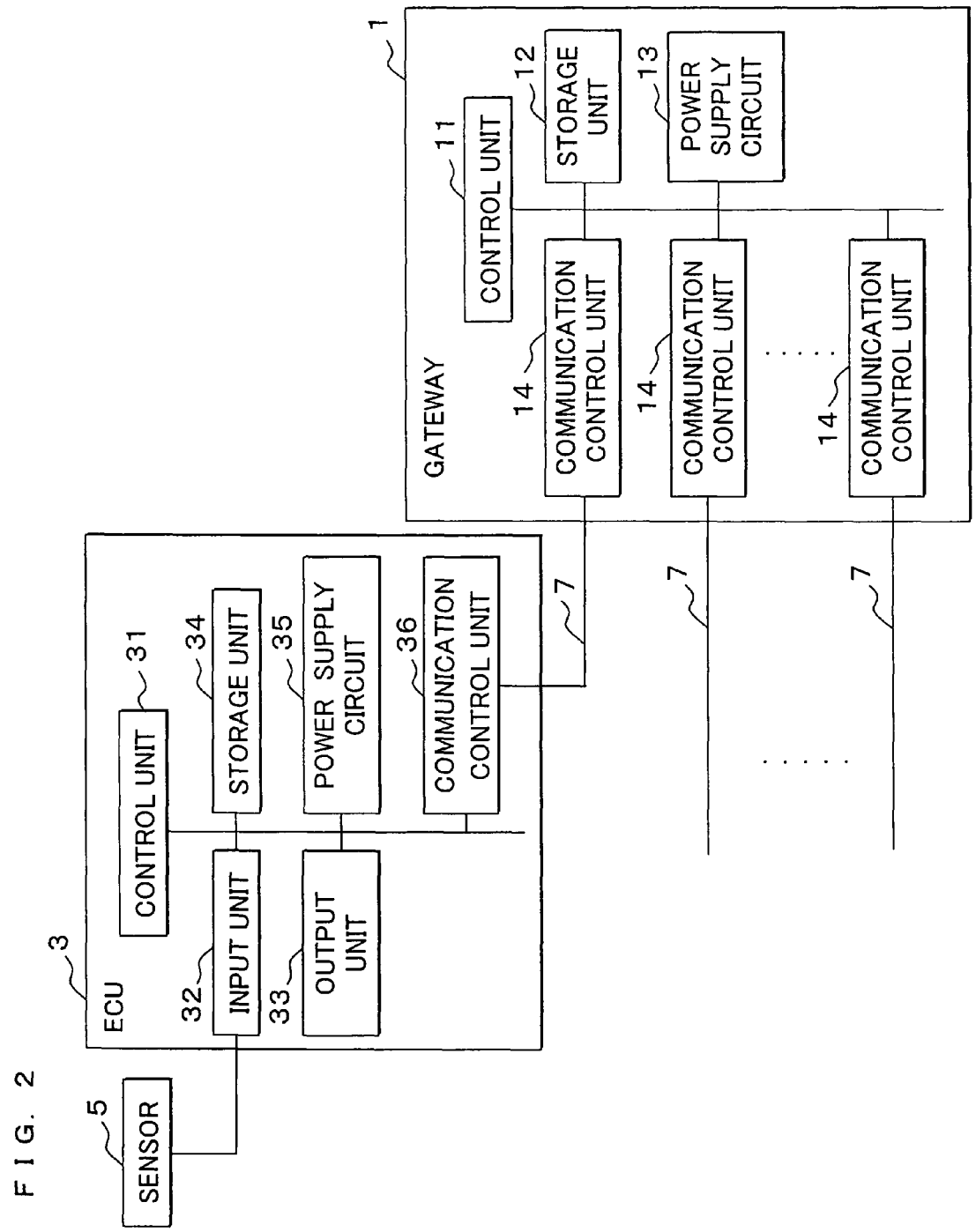
FIG. 2 is a block diagram showing structures of gateway and ECU according to the present invention.

Hereinafter, an embodiment of the present invention is described in detail with reference to drawings. FIG. 1 is a schematic view showing one example of configuration of communication system mountable on a car according to the present invention. In this figure, a numeral 3 is applied to an ECU. Several ECUs are arranged at suitable positions of a car (not shown). Each ECU is configured to perform operations, such as controlling several electronic devices mounted on the car or detecting run state of the car. In addition, a numeral 1 is applied to a gateway in this figure. The gateway is connected to ECUs 3 or another gateway 1, and relays data transmission between the ECUs 3.

The illustrated communication system mountable on a car is configured with seven ECUs 3 and two gateways 1 mounted on the car. The first gateway 1 is connected to four ECUs 3, and the second gateway 2 is connected to three ECUs 3. In addition, these two gateways 1 are connected to each other. Thus, it is possible to perform data transmission between one ECU 3 and another ECU 3 through one or two gateway 1. Further, one of the ECUs 3 and a gateway 1 are respectively connected with a distinct communication line. This communication line is configured with two lines to transmit a differential signal, in a similar manner to a CAN bus. In the communication system mountable on a car according to the present invention, a "dominant" and a "recessive" are utilized as a value of transmitted data. The "dominant" corresponds to "0" of logic bit, and the "recessive" corresponds to "1" of logic bit.

FIG. 2 is a block diagram showing structures of the gateway 1 and the ECU 3 according to the present invention. In FIG. 2, one gateway 1 and one ECU 3 are illustrated, and the other gateway 1 and ECUs 3 are omitted because of similar structures. The ECU 3 includes: an input unit 32 that is connected to a sensor 5 and obtains a signal input from the sensor 5 which detects a run state of the car or the like; an output unit 33 that is connected to an electronic device mounted on the car as a controlled object (not shown) and outputs a control signal and the like; a storage unit 34 that stores a program, data, and the like which is required for controlling; a power supply circuit 35 that supplies power to each unit of the ECU 3; a communication control unit 36 that is connected with a communication line 7 and performs data transmission; a control unit 31 that controls an operation of each unit of the ECU 3, and the like.

The input unit 32 of the ECU 3 is connected to variety of sensors 5, for example to detect a speed, acceleration, engine temperature, and a steering angle of a steering handle of the car. Thus, a detected value is input as a signal from the sensor 5 into the input unit 32. The input unit 32 is configured to obtain the value detected by the sensor 5, store it in the storage unit 34, and to inform to the control unit 31 about the completion of obtaining the detected value from the sensor 5. The output unit 33 is connected to an electronic device that is for controlling variety of devices, such as an engine or a brake of the car. Thus, a control signal for controlling an operation of variety of devices is configured to be output on the basis of control performed by the control unit 31. It should be noted that an ECU 3 may include any one of the input unit 32 and the output unit 33.

The storage unit 34 is configured with a re-writable non-volatile memory element, such as EEPROM (electrically erasable programmable read only memory) or flash memory. A program, data and the like stored in the storage unit 34 in advance are configured to be read out by the control unit 31 for starting an operation, when the ECU 3 is turned on. Further, the storage unit 34 is configured to store variety of data generated in the course of the operation performed by the control unit 31, such as the value detected by the sensor 5, data to be sent to another ECU 3 or a gateway 1 by a communication, and data received from another ECU 3 or a gateway 1. It should be noted that the storage unit 34 may be configured with so-called ROM and RAM (random access memory) that are separately arranged.

The power supply circuit 35 is connected to an electric power supply (not shown), such as an alternator or battery, and is configured to supply power to each unit after adjusting power supplied from the electric power supply to be voltage or current suitable for each unit.

The communication control unit 36 is connected to the gateway 1 via the communication line 7. The communication control unit 36 is configured to read out data from the storage unit 34 on the basis of the instruction from the control unit 31, send the read data to the gateway 1, receive data from the gateway 1, store the received data on the storage unit 34, and to inform about the completion of receiving data to the control unit 31. Further, the communication control unit 36 is configured to perform variety of control operations for communication. For example, the communication control unit 36 is configured to perform a determining operation at the time of sending data whether any collision is generated against data sending performed by the gateway 1 or not, data re-sending operation when the collision is generated, and an error detecting operation that detects the existence of error in received data when the data is received. A detailed way will be described later about data transmission between the ECU 3 and the gateway 1 performed by the communication control unit 36.

The control unit 31 obtains the detected value of the sensor 5 at the input unit 32, performs calculation based on the obtained detected value, generates a control signal based on the calculation, and outputs the control signal from the output unit 33, in order to control the electronic device mounted on the car. When the detected value of the sensor 5 should be shared with another ECU 3, the control unit 31 generates sending data that includes the detected value and gives an instruction of sending to the communication control unit 36. Thus, the generated sending data is configured to be sent to the gateway 1 via the communication line 7 from the communication control unit 36.

In addition, the gateway 1 includes: a storage unit 12 that stores data received from the ECU 3; a power supply circuit 13 that supplies power to each unit; several communication units 14, each of which is connected with a communication line 7 and performs data transmission; and a control unit 11 that controls an operation of each unit of the gateway 1. The storage unit 12 of the gateway 1 is configured with high capacity memory element in order to store large amounts of data received from several ECUs 3 because it is mainly utilized as a communication buffer, although the structure of the storage unit 12 is almost the same as the structure of the storage unit 34 of the ECU 3. Further, the power supply circuit 13 of the gateway 1 is configured, in a manner similar to the power supply circuit 35 of the ECU 3, to connect to an electric power supply (not shown), such as an alternator or battery, and supply power to each unit after adjusting power supplied from the electric power supply to be voltage or current suitable for each unit.

The communication control unit 14 of the gateway 1 also has essentially the same function as the communication control unit 36 of the ECU 3, is connected to the communication control unit 36 of the ECU 3 through the communication line 7, and is configured to perform data transmission to and from the communication control unit 36 of the ECU 3. Further, the gateway 1 includes several communication control unit 14, each of which is connected to one communication control unit 36 of one ECU 3 and is configured to perform one-to-one data transmission with this one communication control unit 36 of one ECU 3. The communication control unit 14 of the gateway 1 can perform data transmission between two gateways 1, with connecting to another communication control unit 14 of another gateway 1 through a communication line 7.

The control unit 11 is configured, when receiving data sent from one ECU 3 at one of own communication control units 14, to perform a data relay to another ECU 3 with giving the received data to another one of own communication control units 14. At this time, the control unit 11 performs an operation that determines a sequential sending order of data stored on the storage unit 12 on the basis of a priority applied to the received data, so-called scheduling operation.

As described above, the communication system mountable on a car according to the present invention is configured to perform one-to-one communication between a communication control unit 36 of an ECU 3 and a communication control unit 14 of a gateway 1 that are connected to each other by one communication line 7. Furthermore, the communication system mountable on a car according to the present invention is configured to transmit a message between an ECU 3 and a gateway 1. This message includes data applied with information, such as ID (identifier) and bit for error detecting. The communication control unit 36 of an ECU 3 and the communication control unit 14 of a gateway 1 are configured to utilize a communication manner that starts sending when a communication line 7 is not used (message is not sent), so-called CSMA (carrier sense multiple access) communication manner. Thus, a right for sending is given to the communication control unit 36 of an ECU 3 or the communication control unit 14 of a gateway 1 that starts message sending earlier. When the communication line 7 is used, the message sending operation is performed after the completion of message receiving.

Furthermore, when the communication control unit 36 of an ECU 3 and the communication control unit 14 of a gateway 1 simultaneously start sending, in other words, when a collision of sending message is generated, a re-sending operation is performed by one of the communication control unit 36 and the communication control unit 14 that detects the collision. After the completion of re-sending, the other one starts re-sending. It is configured that the communication control unit 14 of a gateway 1 is preferred to re-send, when both of the communication control unit 36 and the communication control unit 14 detect the collision. At this time, not only the communication control unit 36 but also the communication control unit 14 does not perform a detecting operation of collision during performing a message sending operation. Not only the communication control unit 36 but also the communication control unit 14 is configured to change into a receiving state after the completion of sending and detects collision with checking the existence of received message (In other words, the communication system mountable on a car according to the present invention does not require to monitor the communication line 7 during message sending, although a conventional CAN must monitor the communication line 7 during message sending to check the existence of received message. It is enough to start the monitoring after the completion of sending message in the communication system mountable on a car according to the present invention). Therefore, an arbitrating operation based on a message ID is not performed by the communication control unit 36 and the communication control unit 14 in the communication system mountable on a car according to the present invention, although a conventional CAN communication performs arbitrating operation with using IDs applied to messages as priority in the case of generating collision of sending message. The scheduling operation for sending message performed in a gateway 1 is based on IDs applied to messages.

Furthermore, in the communication system mountable on a car according to the present invention, the communication control unit 36 of an ECU 3 and the communication control unit 14 of a gateway 1 are configured to send so-called ACK (acknowledgment)/NAK (negative acknowledgment) as a receipt response that informs about the completion of receiving a message to a sender of the message, when receiving the message. When the communication control unit 36 and the communication control unit 14 have a message at this time to be sent to the sender to which the receipt response is sent, they add the message to the receipt response in order to send the receipt response together with the message. In the present invention, the operation is called "piggyback" that sends a message together with a receipt response. The communication control unit 36 and the communication control unit 14 should store a message until receiving a receipt response from a sender after sending the message to the sender, and re-send the message in the case of failing to receive the receipt response within a predetermined period.

FIG. 3A, FIG. 3B and FIG. 3C are schematic views illustrating a piggyback of the communication system mountable on a car according to the present invention. For example, when a message is sent from an ECU 3 to a gateway 1, the gateway 1 receives the message and sends a receipt response to the ECU 3 (see FIG. 3A). When the gateway 1 has a message to be sent to the ECU 3 at this time, the gateway 1 adds the message to be sent onto the receipt response and sends the message together with the receipt response. The ECU 3 receives the message added to the receipt response and sends another receipt response for the receipt to the gateway 1. At this time, the gateway 1 also can add another message to this another receipt response (see FIG. 3B).

When sending message from the ECU 3 and sending message from the gateway 1 collide with each other (FIG. 3C), the gateway 1 preferentially re-sends the message to the ECU 3. These configurations are implemented by setting the period of the gateway 1 shorter than the period of the ECU 3 that is till re-sending message from detecting the collision of sending message. The ECU 3 can add the sending failed message by the collision onto the receipt response for the message being sent from the gateway 1, and send to the gateway 1 the sending failed message together with the receipt response for the message being sent from the gateway 1. As described above, an ECU 3 and a gateway 1 can alternately perform message communication in the communication system mountable on a car according to the present invention, because it is possible to add a message to a receipt response and to send the message together with the receipt response. Thus, it is possible to prevent a message sending operation performed by either communication from being kept waiting continuously, even when the ECU 1 and the gateway 1 have large numbers of message and a communication becomes overloading state. Therefore, it is possible to perform message transmission efficiently. Moreover, even when the collision of sending a message is generated, another collision is not generated by re-sending this message.

In the communication system mountable on a car according to the present invention, the message transmission between an ECU 3 and a gateway 1 is controlled with three kinds of frames and one kind of space by the communication control unit 36 of the ECU 3 and by the communication control unit 14 of the gateway 1. FIG. 4 is a table illustrating roles of frames and space utilized by the communication of the communication system mountable on a car according to the present invention. The communication system mountable on a car according to the present invention utilizes a (1) data frame, (2) remote frame, (3) ACK frame, and a (4) inter frame space.

(1) Data Frame

Figure 5:
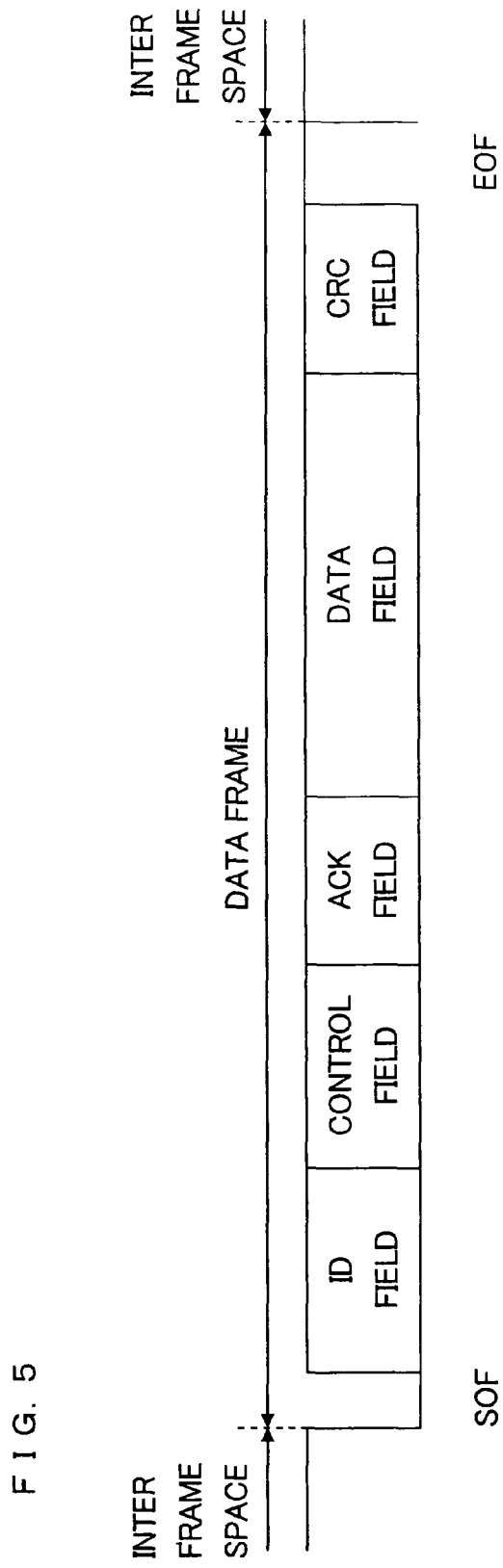
FIG. 5 is a schematic view showing data frame structure of the communication system mountable on a car according to the present invention.

The data frame is for sending a message from a sending unit of ECU 3 or gateway 1 to a receiving unit. Such data frame is utilized even by the conventional CAN communication. The data frame of the communication system mountable on a car according to the present invention has a purpose almost the same as the purpose of the data frame of the conventional CAN, but has a structure somewhat different from the structure of the data frame of the conventional CAN. FIG. 5 is a schematic view showing data frame structure of the communication system mountable on a car according to the present invention. The data frame is structured with the following seven fields:

(a) SOF (start of frame)
(b) ID field
(c) Control field
(d) ACK field
(e) Data field
(f) CRC (cyclic redundancy check) field
(g) EOF (end of frame)

(a) SOF

The SOF according to the present invention is the same as the SOF being set in the data frame of the conventional CAN. The SOF according to the present invention is one bit of dominant indicating the start of the data frame. The communication system mountable on a car according to the present invention (as well as the conventional CAN communication system) is not provided a clock signal that is common to sending side for sending message and receiving side. Thus, the communication control unit 36 of an ECU 3 and the communication control unit 14 of a gateway 1 monitor a communication line 7 to detect SOF (in other words, to detect an edge with respect to the change from a recessive to a dominant), and then synchronize.

(b) ID Field

The ID field according to the present invention is structured similarly to the arbitration field being set in the data frame of the conventional CAN. However, a value of the ID field is utilized just as an ID of message, because the communication system mountable on a car according to the present invention does not perform arbitration based on the ID applied to a message, as described above. There are two types of ID fields. One is configured in a normal format and the other is configured in an extended format (a detailed illustration for the configurations is omitted because the configurations are similar to those of arbitration field of the conventional CAN). Both of these formats include information of ID and RTR (remote transmission request) bit. The ID represents a type of message. The ID in the normal format is 11 bits, and the ID in the extended format is 29 bit. The RTR bit is a bit for discriminating between the data frame, remote frame and the ACK frame. The RTR bit is certainly a dominant in the data frame, recessive in the remote frame, and a dominant in the ACK frame.

(c) Control Field

The control field according to the present invention is the same as the control field being set in the data frame of the conventional CAN. The control field includes information for detecting data length and for discriminating between the normal format and the extended format, and the like.

(d) ACK Field

Figure 6:
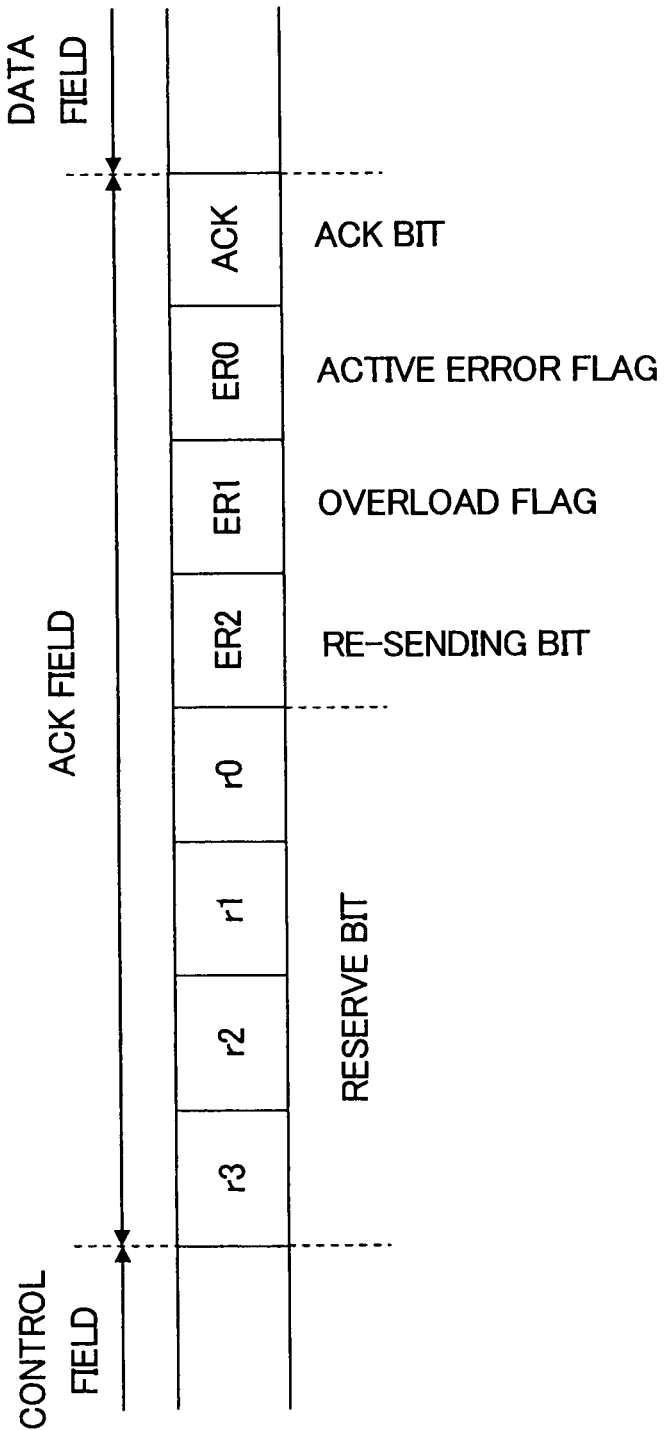
FIG. 6 is a schematic view showing ACK field set in the data frame of the communication system mountable on a car according to the present invention.

In the data frame of the conventional CAN, an ACK field is two bits arranged between a CRC field and an EOF. However, the ACK field in the communication system mountable on a car according to the present invention is 8 bits arranged between the control field and the data field. Thus, the communication system mountable on a car according to the present invention informs of an ACK/NAK in a manner similar to the manner of sending message, which is different from the treating manner for the ACK in the conventional CAN communication. FIG. 6 is a schematic view showing ACK field being set in the data frame of the communication system mountable on a car according to the present invention.

The ACK field is configured with 8 bits including: 4 bits of reserve bit (r 3 to r 0); re-sending bit (ER 2); overload flag (ER 1); active error flag (ER 0); and ACK bit (ACK). The ACK bit is set to be a dominant in the case of informing that receiving message is correctly performed, and a recessive in the case of failing of receiving message correctly.

The active error flag is utilized as a substitute of an error frame of the conventional CAN, for informing about error to one of both the communication control unit 36 and the communication control unit 14 when the other one detects the error. The active error flag is set to be a dominant in the case of informing about error. Although the conventional CAN sends the error frame as soon as an error is detected, an error in the communication system mountable on a car according to the present invention is informed at the timing when a message can be sent (in other words, in the case of obtaining a right for sending).

The overload flag is utilized as a substitute of an overload frame of the conventional CAN, for informing that a predetermined condition is met. The informing operation of overloading is performed when sending message performed by one of an ECU 3 and a gateway 1 must be delayed due to an internal situation of the other one, or when a dominant is detected at the first or second bit of an intermission (described later). The overload flag is set in the case of informing about an occurrence of overloading. The overloading is informed at the timing when a message can be sent in the communication system mountable on a car according to the present invention, although the conventional CAN sends overload frame as soon as the condition described above is met.

The re-sending bit is a bit representing whether a message in a sending data frame is for re-sending or not. When the message is for re-sending, the re-sending bit is set to be a dominant. The communication control unit 36 of an ECU 3 and the communication control unit 14 of a gateway 1 can determine whether a message transmission fails or the like, on the basis of checking each bit of the ACK field. Therefore, it is possible to perform error handling for these failures.

(e) Data Field

The data field according to the present invention is similar to the data field set in the data frame of the conventional CAN. The data field consists of 0 to 8 bits data, and is sent in a manner of MSB (most significant bit) first. The data field is provided a variety of data, such as the detected value of the sensor 5 or processing instruction from one ECU 3 to another ECU 3, and then sent.

(f) CRC Field

The CRC field consists of 15 bits of CRC sequence and 1 bit of CRC delimiter (a bit for separating), for detecting error when the communication control unit 36 of an ECU 3 or the communication control unit 14 of a gateway 1 receives a message. The CRC sequence can be obtained by the calculation with a predetermined generating function with respect to values of the SOF, ID field, control field, ACK field and the data field. This generating function utilized for calculation is similar to a function utilized in the conventional CAN. When receiving a message, the communication control unit 36 or the communication control unit 14 compares a calculated value with the generating function with respect to the received message and a value of CRC sequence in the received message, in order to detect an error. When one of these two values is not identical with the other one, it is determined that an error occurs. Although a CRC delimiter of the conventional CAN is a recessive, the CRC delimiter is a dominant in the communication system mountable on a car according to the present invention.

(g) EOF

The EOF according to the present invention is similar to an EOF being set in a data frame of the conventional CAN, and is 7 bits of recessive indicating the end of the data frame.

(2) Remote Frame

The remote frame is utilized for requesting from a sending unit of an ECU 3 or a gateway 1 to a receiving unit to send a message having a specified ID. The conventional CAN communication also utilizes a remote frame. The remote frame consists of six fields (SOF, ID field, control field, ACK field, CRC field, and EOF) that are identical to fields of the data frame excluding the data field. The remote frame is different from the data frame in the existence of the data field, as described above, and in a value of RTR bit in the ID field.

Although the RTR bit of the data frame is a dominant, the RTR bit of the remote frame is a recessive.

(3) ACK Frame

Figure 3:
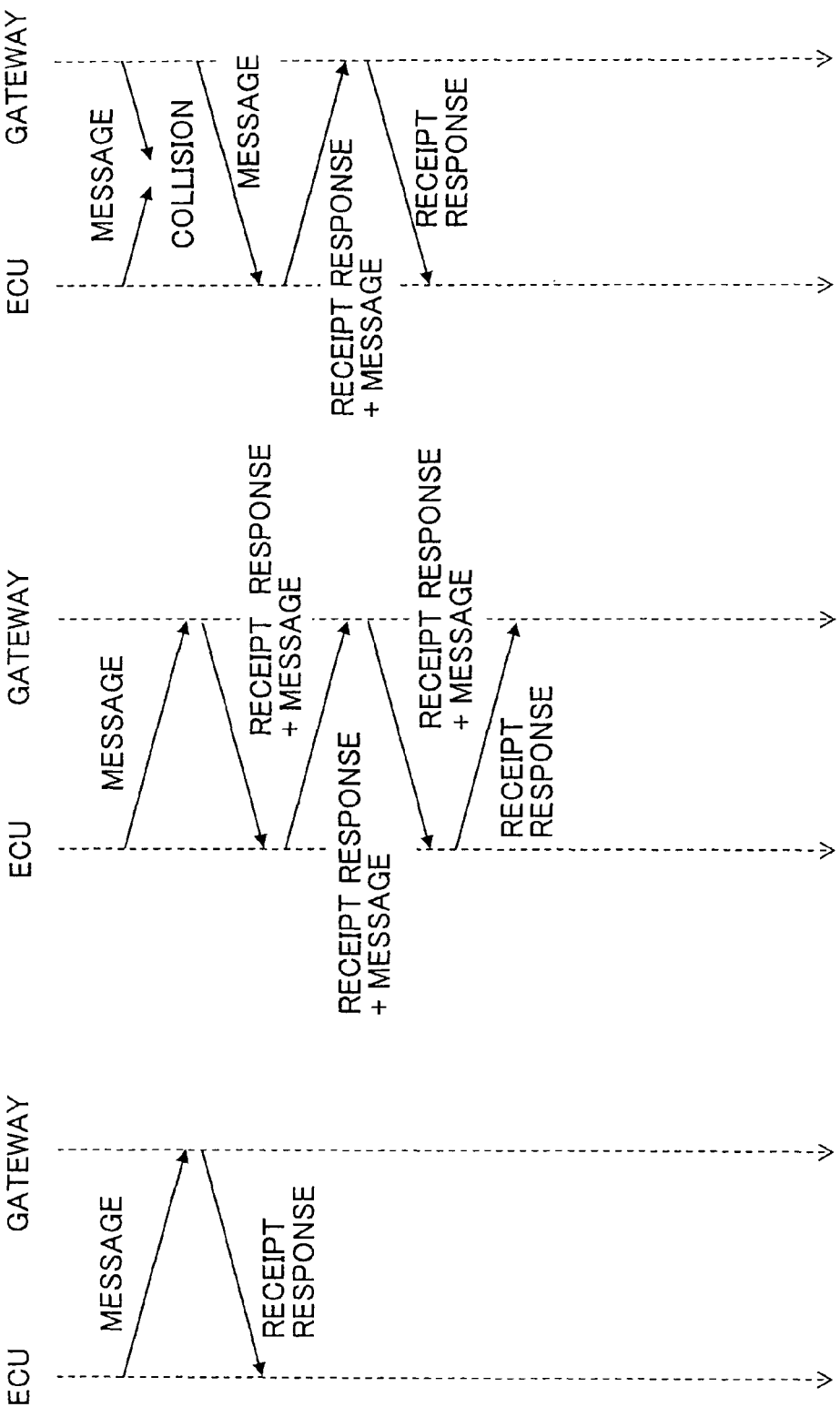
FIG. 3A, FIG. 3B and FIG. 3C are schematic views is a schematic view illustrating a piggyback of the communication system mountable on a car according to the present invention.

The ACK/NAC frame is utilized for informing from a receiving unit of an ECU 3 or a gateway 1 to a sending unit whether a message is received correctly or not, and corresponds to the receipt response shown in FIG. 3. The ACK frame of the communication system mountable on a car according to the present invention is not utilized by the conventional CAN communication. The ACK frame, as well as the remote frame, consists of six fields that are identical to fields of the data frame excluding the data field. The ACK frame is different from the remote frame in the value of RTR bit in the ID field. Although the RTR bit of the remote frame is a recessive, the RTR bit of the ACK frame is a dominant.

As shown in FIG. 3, it is possible to send a receipt response together with a message in the communication system mountable on a car according to the present invention. The communication control unit 36 of the ECU 3 and the communication control unit 14 of a gateway 1 are configured to add a data field to the ACK frame and then perform sending, for this case. Such a data frame is different from such an ACK frame in a value of ACK bit in the ACK field. Although the ACK bit of the data frame is a recessive, the ACK bit of the ACK frame is a dominant.

(4) Inter Frame Space

The inter frame space is a bit field for separating the data frame, remote frame and the ACK frame from the previous frame. The communication control unit 36 of an ECU 3 and the communication control unit 14 of a gateway 1 can receive sequential frames with separating into a front frame and a rear frame, because the inter frame space is respectively inserted into between the frames.

The inter frame space is utilized by the conventional CAN communication, too. The inter frame space of the conventional CAN consists of an intermission being 3 bits of recessive and a suspend transmission being 8 bits of recessive. The inter frame space of the communication system mountable on a car according to the present invention consists of only an intermission being 3 bits of recessive, without a suspend transmission (in short, the inter frame space is the intermission). When detecting a dominant within the intermission, the communication control unit 36 of an ECU 3 and the communication control unit 14 of a gateway 1 are configured to inform of an occurrence of overloading. It should be noted that, when detecting a dominant at the third bit of the intermission, the communication control unit 36 of an ECU 3 and the communication control unit 14 of a gateway 1 recognize this dominant bit as the SOF.

As described above, a communication control is configured to be performed with the data frame, remote frame, ACK frame and the inter frame space, in the communication system mountable on a car according to the present invention. Although the conventional CAN additionally utilizes an error frame and an overload frame, the communication system mountable on a car according to the present invention does not require utilizing the error frame and the overload frame. In the communication system mountable on a car according to the present invention, the communication control unit 36 and the communication control unit 14 do not monitor the communication line 7 during a message sending operation. In other words, they do not monitor a receipt of message. Further, the communication system mountable on a car according to the present invention does not cause a passive error occurred in the conventional CAN, because utilizing no passive error state which is utilized by the conventional CAN. Thus, the communication system mountable on a car according to the present invention is configured to utilize the active error flags being set in the ACK fields in the data frame, remote frame and the ACK frame, in order to inform about error. Furthermore, the communication system mountable on a car according to the present invention can inform of an occurrence of overloading with the overload flag of the ACK field, but without an overload frame. Moreover, the communication system mountable on a car according to the present invention does not require utilizing the suspend transmission in the inter frame space, because utilizing no error passive state utilized by the conventional CAN.

There is a state that transmissions of the data frame, remote frame, ACK frame and the inter frame space are not performed between the communication control unit 36 of an ECU 3 and the communication control unit 14 of a gateway 1. This state is a free state of the communication line 7, and is called a bus idle. At the bus idle, the communication line 7 is always recessive. Thus, the communication control unit 36 or the communication control unit 14 can start sending a message. The communication control unit 36 and the communication control unit 14 can start receiving a message through detecting that the recessive level at the bus idle changes into a level having a dominant in the SOF.

Figure 7:
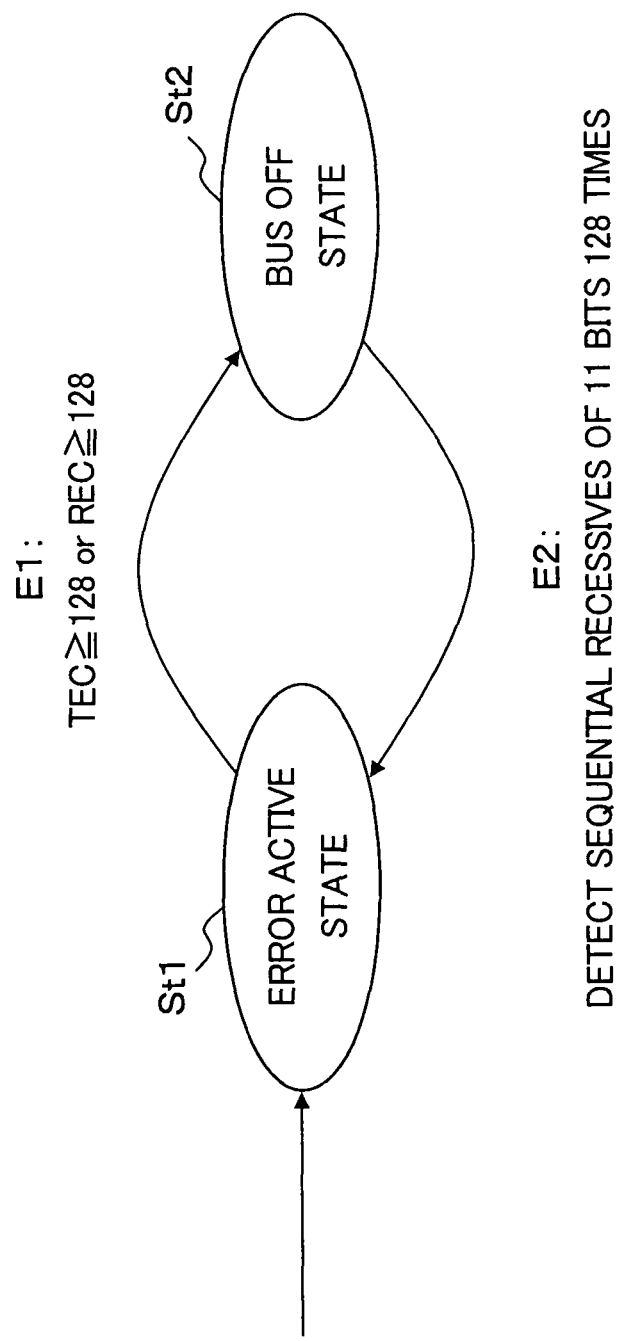
FIG. 7 is a state-transition diagram illustrating an error control of the communication system mountable on a car according to the present invention.

Hereinafter, it will be described about the error control operation performed by the communication control unit 36 of an ECU 3 and the communication control unit 14 of a gateway 1. Although the following description is directed to the communication control unit 14 of a gateway 1, the control communication control unit 36 of an ECU 3 also performs the error control operation in a similar manner. FIG. 7 is a state-transition diagram illustrating an error control of the communication system mountable on a car according to the present invention. The communication control unit 14 of the gateway 1 is in an error active state (St 1) or a bus off state (St 2), and is configured to perform operations with changing the state based on a predetermined condition. Further, the communication control unit 14 includes a sending error counter (TEC) and a receiving error counter (REC). The value of TEC is configured to be increased when an error occurs on the sending message, and the value of REC is configured to be increased when an error occurs on the receiving message. The value of TEC may be configured to be decreased when the sending message succeeds, and the value of REC may be configured to be decreased when the receiving message succeeds. The TEC and the REC are utilized for determination of a condition relating to the state-transition of the communication control unit 14.

In the error control operation performed by the communication system mountable on a car according to the present invention, the error active state (St 1) means a state that the communication control unit 14 can transmit a message via the communication line 7. At the activation of a gateway 1, the communication 14 constantly becomes in this state. In other words, an initial state of the communication control unit 14 is the error active state (St 1). On the other hand, the bus off state (St 2) means a state that the communication control unit 14 cannot transmit a message via the communication line 7. In the bus off state (St 2), the communication control unit 14 is prohibited performing all the operations, and thus cannot transmit a message.

As described above, the TEC value of the communication control unit 14 is increased when an error occurs on the sending message, while the REC value of the communication control unit 14 is increased when an error occurs on the receiving message. When the TEC value or the REC value in the error active state (St 1) becomes no less than 128 (event E 1), the communication control unit 14 is configured to change into the bus off state (St 2) and then a message transmission is prohibited. In the bus off state (St 2), the communication control unit 14 monitors the communication line 7. When detecting sequential recessives of 11 bits 128 times (event E2), the communication control unit 14 is configured to change into the error active state (St 1), and then the message transmission is re-started. The TEC value and the REC value are configured to be 0, when the state is changed from the bus off state (St 2) to the error active state (St 1).

Thus, it is possible to stop the communication performed by the communication control unit 14, when errors no less than a predetermined number are detected, because the error control operation is preformed with utilizing the TEC and the REC. The communication control unit 14 can perform an operation for searching and removing the error occurring reason or an operation for recovering from the error, in the bus off state that stops communicating operations. The TEC value may be configured to be increased, for example, when the communication control unit 14 sends a frame having a dominant active error flag in the ACK field. On the other hand, the TEC value may be configured to be decreased, when the communication control unit 14 receives the ACK frame based on the sent data frame. The REC value may be configured to be increased, for example, when the communication control unit 14 detects an error based on the mismatch of the CRC field in the received frame. On the other hand, the REC value may be configured to be decreased, when the receiving operation is performed correctly with the match of CRC field.

An error control operation of the conventional CAN further utilizes an error passive state, in addition to the error active state and the bus off state, and is performed on the basis of the state-transition among the three states. In the conventional CAN, the sending message is limited in the error passive state, because an ECU or a gateway cannot send a message during a period of the suspend transmission. The reason is that the conventional CAN utilizes one communication line connected to several ECUs and restricts the sending message operation performed by an ECU having high error occurrence. However, the communication system mountable on a car according to the present invention utilizes one communication line connected to both a communication control unit 36 of an ECU 3 and a communication control unit 14 of a gateway 1, in the one-to-one manner. Thus, a destination of a message sent by the communication control unit 14 is restricted to the communication control unit 36. Therefore, the communication system mountable on a car according to the present invention does not require arranging such an error passive state.

Figure 8:
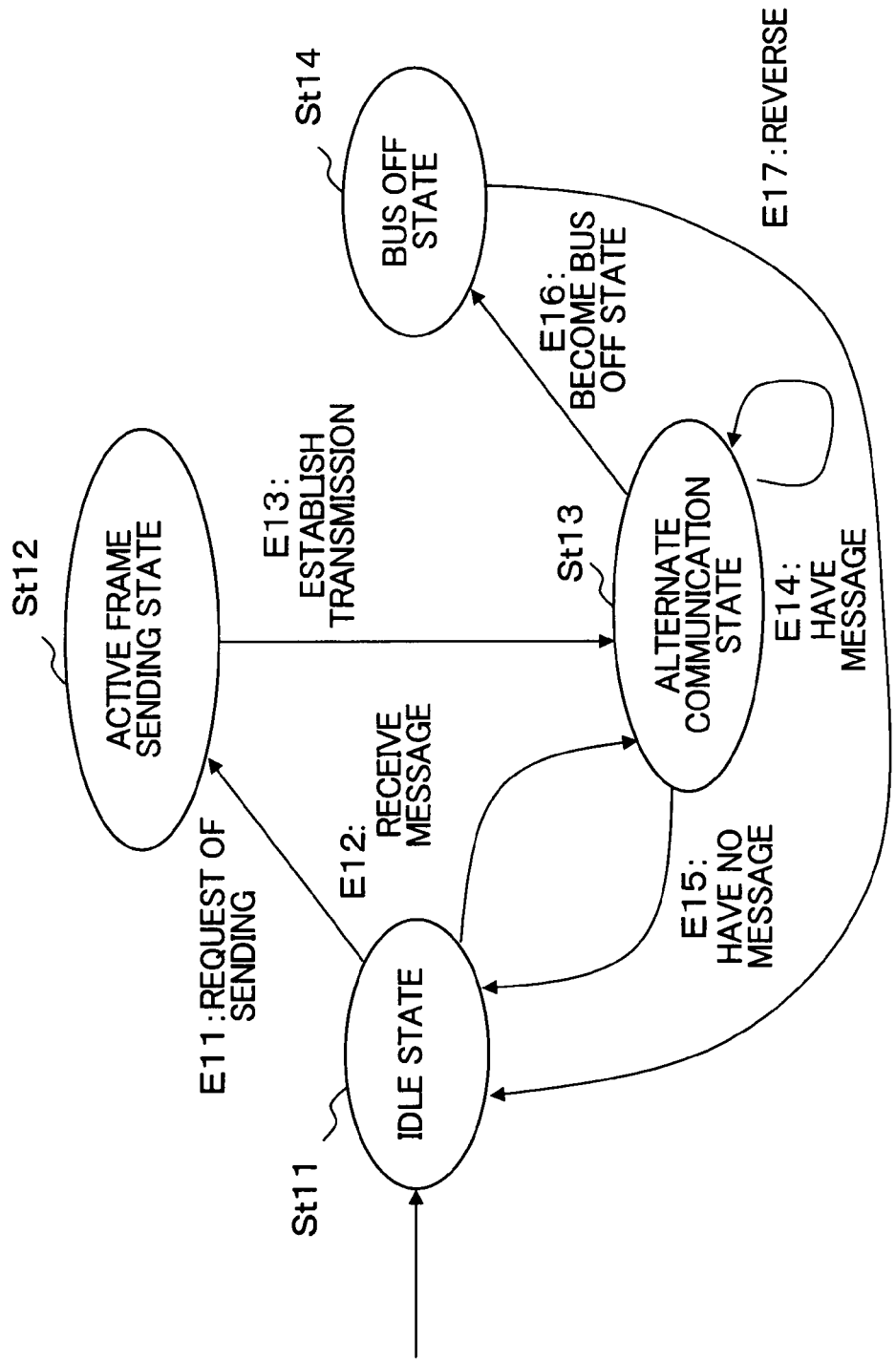
FIG. 8 is a state-transition diagram illustrating a communication control of the communication system mountable on a car according to the present invention.

Next, it will be described about communication control operations performed by the communication control unit 36 of an ECU 3 and the communication control unit 14 of the gateway 1. Although the following description is directed to the communication control unit 14 of a gateway 1, the control communication control unit 36 of an ECU 3 also performs the communication control operation in a similar manner. FIG. 8 is a state-transition diagram illustrating a communication control of the communication system mountable on a car according to the present invention. FIG. 9 is a state-transition table illustrating the communication control of the communication system mountable on a car according to the present invention. The communication control unit 14 of a gateway is configured to perform the communication control operation, with changing own state to be an idle state (St 11), activation frame sending state (St 12), alternate communication state (St 13) and a bus off state (St 14). It should be noted that the state-transition of the communication control operation shown by FIG. 8 and FIG. 9 includes the state-transition of the error control operation shown by FIG. 7. The error active state (St 1) of the error control operation corresponds to a combination of three states: the idle state (St 11); activation frame sending state (St 12); and the alternate communication state (St 13) of the communication control operation. Further, the bus off state (St 2) of the error control operation equals to the bus off state (St 14) of the communication control operation.

In the communication control operation performed by the communication system mountable on a car according to the present invention, the idle state (St 11) is an initial state that there are no message (data frame or remote frame) to be sent by the communication control unit 14, of the communication control unit 14 for performing the communication control operation. In this state, the communication control unit 14 monitors the communication line 7 and waits for receiving a message from the ECU 3. The communication control unit 14 is configured to change from the idle state (St 11) to the activation frame sending state (St 12), when obtaining a request of sending message from the control unit 11 of the gateway 1 (event E 11). Further, the communication control unit 14 is configured to change from the idle state (St 11) to the alternate communication state (St 13), when receiving a message from the ECU 3 (event E 12).

The activation frame sending state (St 12) is a state that the communication control unit 14 has a message to be sent and is sending the message. This state is maintained until the communication control unit 14 receives a receipt response (ACK frame) from the ECU 3 after the completion of sending the message. When the message transmission is established by the receipt of the receipt response sent from the ECU 3 (event E 13), the communication control unit 14 is configured to change from the activation frame sending state (St 12) into the alternate communication state (St 13).

The alternate communication state (St 13) is a state that message sending operations and message receiving operations are alternately performed through the transmission of receipt response together with message between the gateway 1 and the ECU 3, as shown by the FIG. 3B. The communication control unit 14 is configured to check the receipt response being sent from the ECU 3, and to perform a message sending operation and a message receive operation alternately with maintaining the alternate communication state (St 13) when a message is added to the receipt response (event E 14). On the other hand, when a message is not added to the receipt response (event E 15), the communication control unit 14 changes from the alternate communication state (St 13) to the idle state (St 11), and waits until obtaining a sending request from the control unit 11 or receiving a massage being sent from the ECU 3. Furthermore, when the TEC value or REC value of the error counter becomes no less than 128 and a condition is established for the bus off state (event E 16), the communication control unit 14 changes from the alternate communication state (St 13) into the bus off state (St 14).

The bus off state (St 14) is a state that the communication control unit 14 can perform no message transmission via the communication line 7. In the bus off state (St 14), the communication control unit 14 monitors the communication line 7. When detecting sequential recessives of 11 bits 128 times (event E 17), the communication control unit 14 is configured to change from the bus off state (St 14) into the idle state (St 11). The TEC value and the REC value are configured to be initialized and then to be 0, when the state is changed from the bus off state (St 14) to the idle state (St 11).

As described above, the communication control unit 14 performs message transmissions based on the state-transits shown by FIG. 8 and FIG. 9. Therefore, the gateway 1 and the ECU 3 can alternately perform message transmissions, as shown by FIG. 3B.

Next, it will be described about a determining operation of a message sending collision and a data re-sending operation performed by the communication control unit 36 of the ECU 3 and the communication control unit 14 of the gateway 1. In the communication system mountable on a car according to the present invention, when there are successive 5 bits with the same value (dominant or recessive) with respect to the bits from the SOF of the data frame, remote frame and the ACK frame to the CRC sequence of the CRC field, the message sending operation is performed after the communication control unit 36 and the communication control unit 14 add a 1 bit of reverse data for the successive 5 bits onto the following bit. This operation is so-called bit-stuff, similar to an operation utilized in the conventional CAN. Thus, one signal change is generated every 5 bits from the SOF of a message to the CRC sequence of the CRC field.

With using these configurations, the communication control unit 36 and the communication control unit 14 of the communication system mountable on a car according to the present invention determines that no message sending collision is generated and that the communication line 7 is in the free state, when detecting no dominant within 7 bits after sending the CRC delimiter of the CRC field. On the other hand, it is possible to determine that a message sending collision is generated, when a dominant is detected within at least these 7 bits. Because a message is provided one signal change every 5 bits by the bit-stuff, a bit of dominant is detected within 6 bits in the case of generating the message sending collision. Thus, it is configured to set a collision determining period to be a 7 bits period (=6+1) taking into account the one bit of accidental clock error.

The communication control unit 36 and the communication control unit 14 utilize the five periods (time) described below, upon controlling the message re-sending operation. It should be noted that the following description refers to each unit of time as a "bit time", because the actual time fluctuates on the basis of the operating frequency (or the communication speed) of the communication system mountable on a car. The bit time is a relative time required for sending (processing) one bit, and is independent from the operating frequency. A data of 8 bits is sent for 8 bit times.

(1) Message sending time: Cm
(2) Maximum propagation delay time for sending message: τ
(3) EOF period: tEOF
(4) IFS period: tIFS
(5) Accidental clock error: α

(1) Message Sending Time: Cm

The message sending time Cm is time required for sending from SOF till CRC delimiter of the data frame, remote frame or the ACK frame. In other words, the message sending time is identical to the bit length from the SOF till the CRC delimiter of each frame.

(2) Maximum Propagation Delay Time for Sending Message: τ

The maximum propagation delay time τ is maximum time required for propagating a message from a receiving side to a sending side. The time required for propagating includes delay time to propagate a signal at the communication line 7, needed time to transmit a message, and the like. Even in the case that the communication system mountable on a car is configured with several gateways 1 and several ECUs 3 as shown by FIG. 1, the maximum propagation delay time τ is common for all the gateways 1 and the ECUs 3 and is set on the basis of a communication pathway having the largest delay. The maximum propagation delay time t1 is determined upon designing the communication system mountable on a car, and is stored in advance by communication control units 14 of all the gateways 1 and by communication control units 36 of all the ECUs 3. For example, a delay of 5 ns is caused every 1 m of the communication line 7. Thus, 10 m of the communication line 7 causes a round-trip propagation delay time about 100 ns (one bit time), at 10 Mbps of the communication speed. Further, it causes a round-trip propagation delay about 10 bit hours, at 100 Mbps of the communication speed.

(3) EOF Period: tEOF

It is referred to the EOF period of the data frame, remote frame or the ACK frame as the tEOF. The EOF is 7 bits as described above, and thus the tEOF corresponds to 7 bit times.

(4) IFS Period: tIFS

It is referred to the period of the inter frame space as the tIFS. The inter frame space is 3 bits as described above, and thus tIFS corresponds to 3 bit times.

(5) Accidental Clock Period: α

The accidental clock period α is a required period for establishing a message transmission multiplied by e % of accidental clock error between the communication control unit 36 of the ECU 3 and the communication control unit 14 of the gateway 1 performing the message transmission. Particularly, the accidental clock period α is calculated by the following [formula 1].

$$\alpha = (tEOF + tIFS + 2\tau) \times e \qquad \text{[Formula 1]}$$

Figure 10:
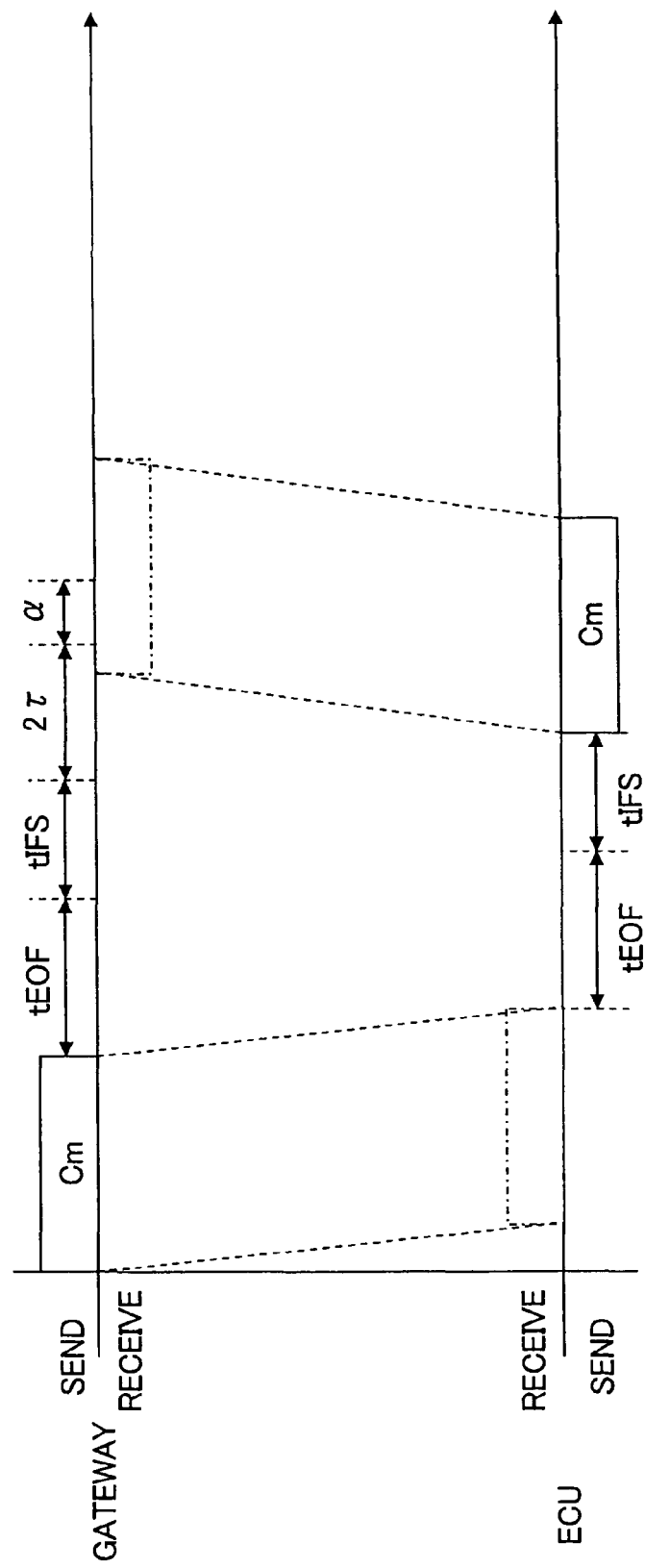
FIG. 10 is a schematic view showing one example of communication of the communication system mountable on a car according to the present invention.

FIG. 10 shows one example of communication of the communication system mountable on a car according to the present invention, in the case that a message is correctly sent from the gateway 1 to the ECU 3. For example, the communication control unit 14 of the gateway 1 sends data from the SOF till the CRC delimiter of the data frame toward the ECU 3, the communication control unit 36 of the ECU 3 receives the sent data. When receiving the sent data after a delay time depending on the communication line 7, the communication control unit 36 of the ECU 3 sends the ACK frame as the receipt response to the gateway 1 after periods of the EOF and the inter frame space (i.e., a period=tEOF+tIFS) followed by the receipt of the CRC delimiter of the data frame. The ACK frame being sent from the ECU 3 is received by the communication control unit 14 of the gateway 1 after the delay time depending on the communication line 7. When the communication described above is correctly performed, the SOF of the ACK frame is received during the period shown by the following [formula 2] after the communication control unit 14 of the gateway 1 sends the CRC delimiter of the data frame.

$$tEOF + tIFS - \alpha \leq \text{receiving period} \leq tIFS + 2\tau + \alpha \qquad \text{[formula 2]}$$

Thus, the communication control unit 14 of the gateway 1 determines that an error is generated on the transmitting operation of a message in the case of receiving no ACK frame from the ECU 3 within this receiving period, and then re-sends the message. Further, it is determined that a message sending operation of the gateway 1 collides with a message sending operation of the ECU 3, in the case that a message is received from the ECU 3 before the completion of a predetermined period (tEOF+tIFS−α) followed by the sending operation of the CRC delimiter performed by the communication control unit 14 of the gateway 1. In addition, it is determined that the ECU 3 can fail to receive a message, in the case that the ACK frame cannot be received within a predetermined period (tEOF+tIFS+2τ+α). Thus, a message re-sending operation is performed. While not shown, the communication control unit 36 of the ECU 3 is configured similarly. In other words, the predetermined periods (tEOF+tIFS−α) are set for the gateway 1 and the ECU 3 as a period determining whether a message collision occurs or not, and the period represented by the [formula 2] is set as the waiting before receiving period for waiting the receipt of the receipt response.

While the message re-sending operations are performed by the communication control unit 14 of the gateway 1 and the communication control unit 36 of the ECU 3, the operations are based on the following two policies:

The message re-sending operation is performed, in the case that a normal ACK frame is not received during the receiving period described above followed by a message sending operation.

The gateway 1 is preferred for the massage re-sending operation, and the ECU 3 waits the massage re-sending operation performed by the gateway 1 and then performs the massage re-sending operation in the case of receiving no message within a predetermined time.

Figure 11:
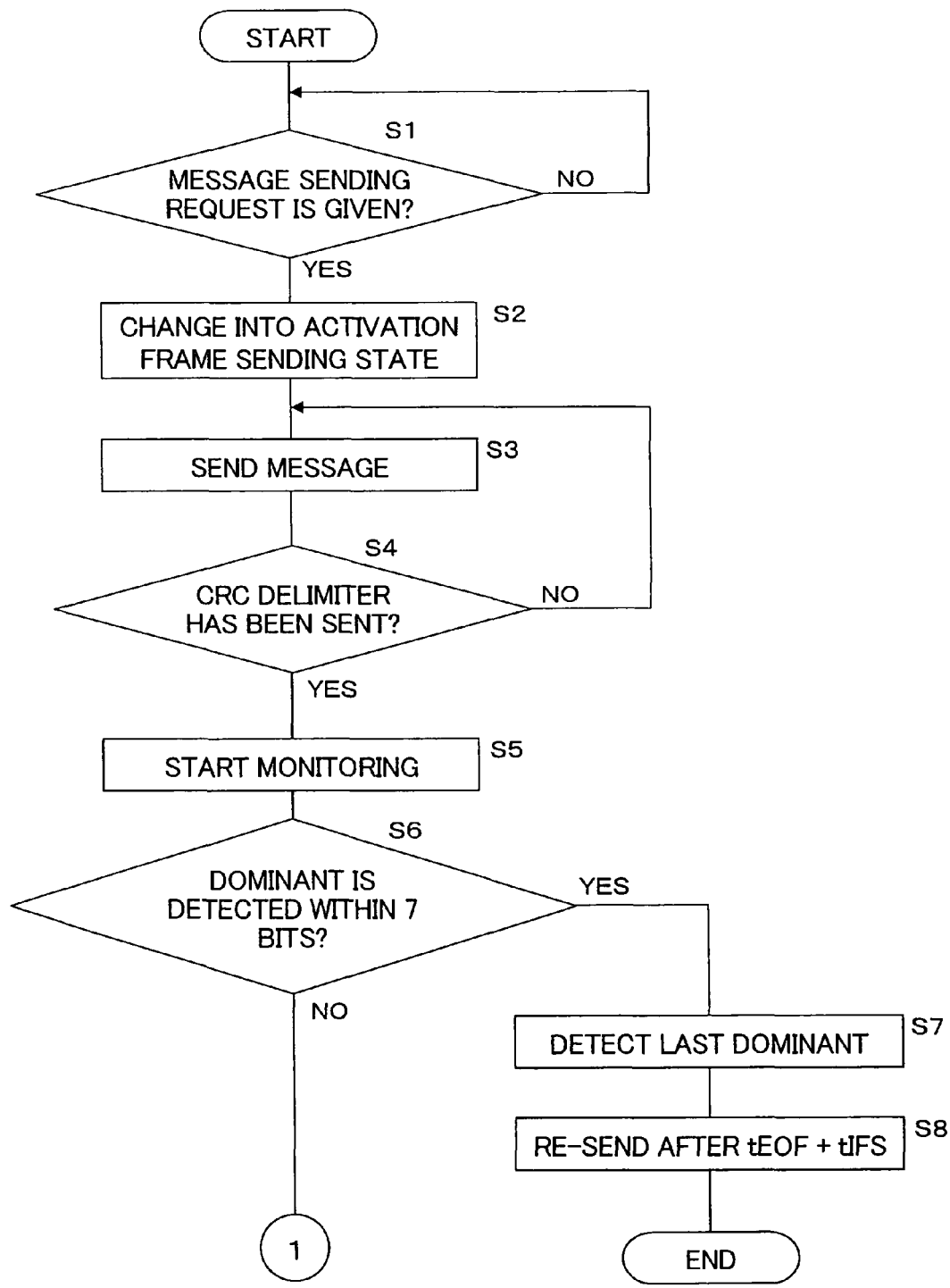
FIG. 11 is a flowchart illustrating a procedure of message re-sending operation performed by a communication control unit of the gateway of the communication system mountable on a car according to the present invention.
Figure 12:
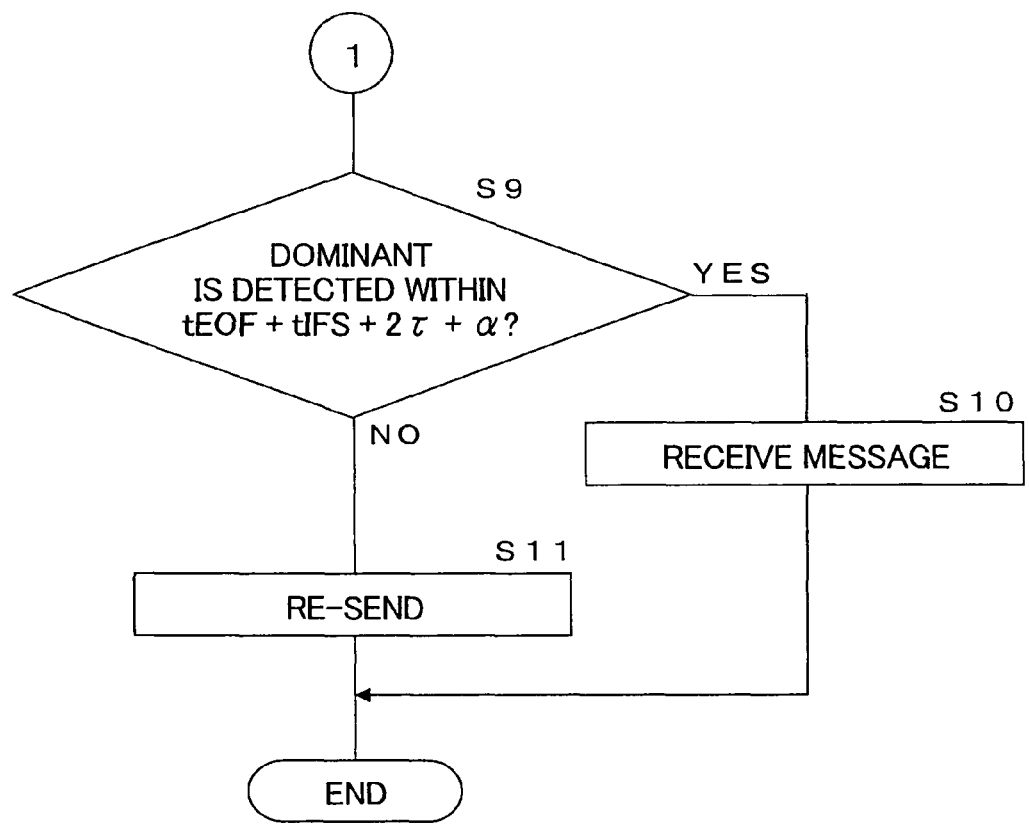
FIG. 12 is a flowchart illustrating a procedure of message re-sending operation performed by a communication control unit of the gateway of the communication system mountable on a car according to the present invention.

FIG. 11 and FIG. 12 are flowcharts illustrating a procedure of message re-sending operation performed by a communication control unit 14 of the gateway 1 of the communication system mountable on a car according to the present invention. In these figures, a dominant is abbreviated to "D". Firstly, the communication control unit 14 of the gateway 1 checks whether a message sending request is given by the control unit 11 (step S1). When the message sending request is not given (S1: NO), the communication control unit 14 waits until the control unit 11 gives the message sending request. When the message sending request is given (S1: YES), the communication control unit 14 changes from the idle state (St 11) shown by FIG. 8 and FIG. 9 into the activation frame sending state (St 12: step S2). Then, the communication control unit 14 reads out a message from the storage unit 12 and send the read message to the ECU 3 (step S3).

The communication control unit 14 sends a message (data frame) sequentially from the SOF, and checks whether the CRC delimiter has been sent or not (step S4). When the CRC delimiter has not been sent (S4: NO), the communication control unit 14 returns to the step S3 and continues the message sending operation. When the CRC delimiter has been sent (S4: YES), the communication control unit 14 starts monitoring the communication line 7 (step S5), and checks whether a dominant is detected within a predetermined period (7 bits) followed by the sending operation of the CRC delimiter (step S6).

When the communication control unit 14 detects a dominant within the predetermined period (7 bits) (S6: YES), it is considered that the message sending operation performed by the communication control unit 14 of the gateway 1 collides with the message sending operation performed by the ECU 3. Thus, the communication control unit 14 detects last dominant (the CRC delimiter in the data frame sent from the ECU 3: step S7), and then performs the message re-sending operation after the predetermined period (tEOF+tIFS) followed by the detection of the last dominant (step S8).

When detecting no dominant within the predetermined period (7 bits) (S6: NO), the communication control unit 14 further checks whether a dominant is detected within the predetermined period (tEOF+tIFS+2τ+α) (step S9). When the communication control unit 14 detects a dominant within the predetermined period (tEOF+tIFS+2τ+α) (S9: YES), it is considered that the receipt response from the ECU 3 is obtained. Thus, the communication control unit 14 receives the message from the ECU 3 (step S10) and then completes the procedure. When the communication control unit 14 detects no dominant within the predetermined period (tEOF+tIFS+2τ+α) (S9: NO), it is considered that the message sending operation performed by the communication control unit 14 of the gateway 1 collides with the message sending operation performed by the ECU 3, or that the ECU 3 has not received the message. Thus, the communication control unit 14 performs the message re-sending operation (step S11).

Figure 13:
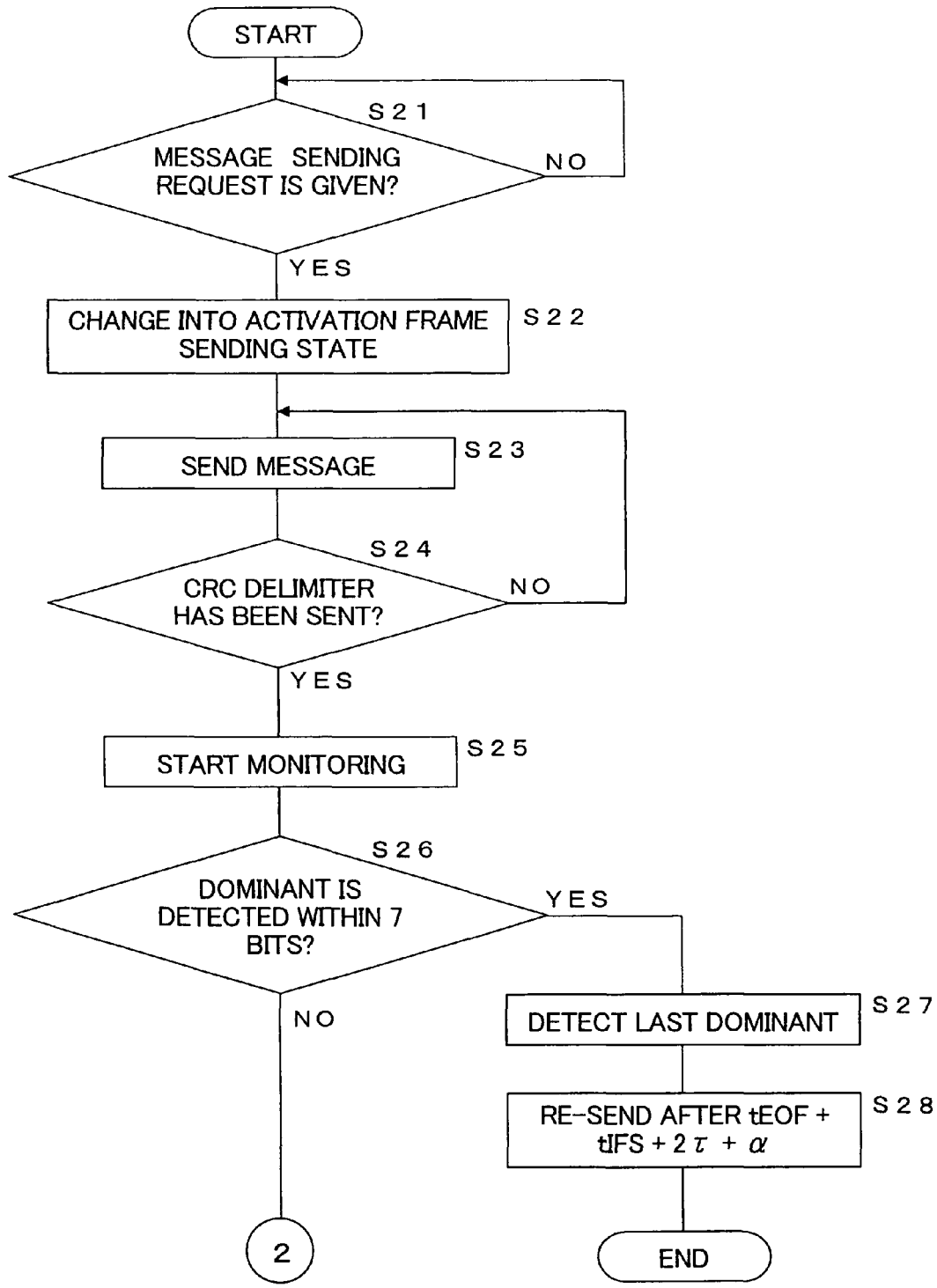
FIG. 13 is a flowchart illustrating a procedure of message re-sending operation performed by a communication control unit of the ECU of the communication system mountable on a car according to the present invention.
Figure 14:
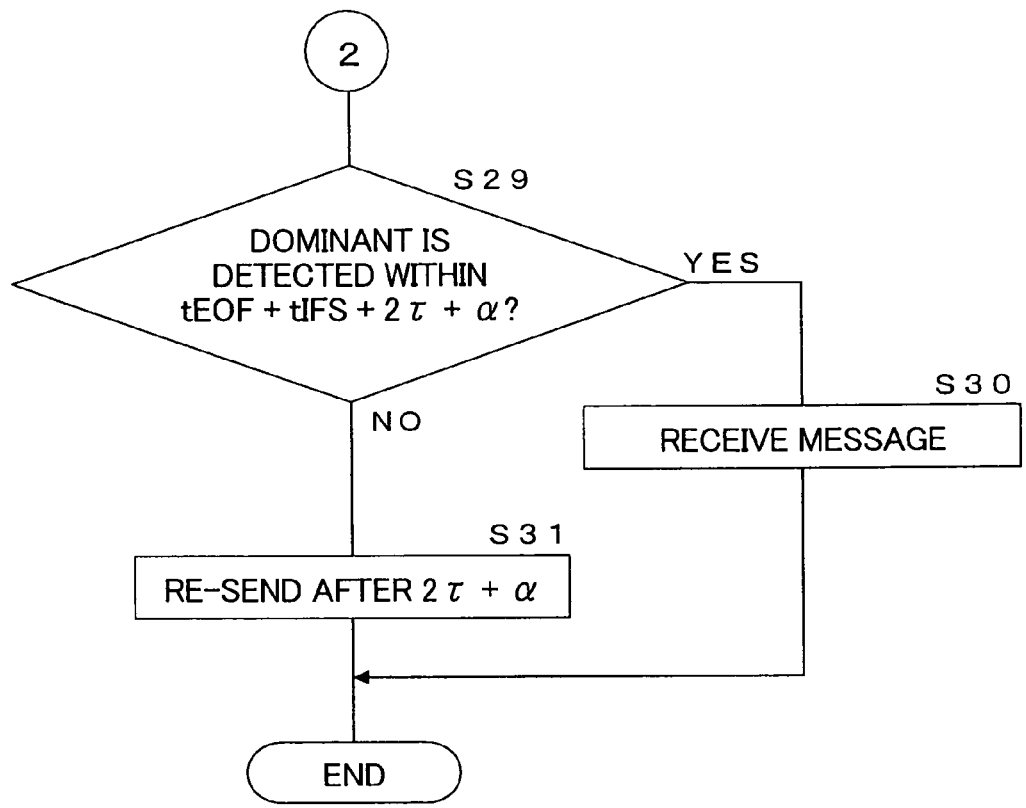
FIG. 14 is a flowchart illustrating a procedure of message re-sending operation performed by a communication control unit of the ECU of the communication system mountable on a car according to the present invention.

FIG. 13 and FIG. 14 are flowcharts illustrating a procedure of message re-sending operation performed by a communication control unit 36 of the ECU 3 of the communication system mountable on a car according to the present invention. Although performing the message re-sending operation similarly to the communication control unit 14 of the gateway 1, the communication control unit 36 of the ECU 3 has waiting time for re-sending message different from the waiting time of the communication control unit 14 of the gateway 1. The waiting time of the communication control unit 14 of the gateway 1 is set to be shorter than the waiting time of the communication control unit 36 of the ECU 3.

Firstly, the communication control unit 36 of the ECU 3 checks whether a message sending request is given by the control unit 31 (step S21). When the message sending request is not given (S21: NO), the communication control unit 36 waits until the control unit 31 gives the message sending request. When the message sending request is given by the control unit 31 (S21: YES), the communication control unit 36 changes from the idle state (St 11) to the activation frame sending state (St 12: step S22). Then, the communication control unit 36 reads out a message from the storage unit 34 and send the read message to the gateway 1 (step S23).

The communication control unit 36 sends a message (data frame) sequentially from the SOF, and checks whether the CRC delimiter has been sent or not (step S24). When the CRC delimiter has not been sent (S24: NO), the communication control unit 36 returns to the step S23 and continues the message sending operation. When the CRC delimiter has been sent (S24: YES), the communication control unit 36 starts monitoring the communication line 7 (step S25), and checks whether a dominant is detected within a predetermined period (7 bits) followed by the sending operation of the CRC delimiter (step S26).

When the communication control unit 36 detects a dominant within the predetermined period (7 bits) (S26: YES), it is considered that the message sending operation performed by the communication control unit 14 of the gateway 1 collides with the message sending operation performed by the ECU 3. Thus, the communication control unit 36 detects last dominant (step S27), and then performs the message re-sending operation after the predetermined period (tEOF+tIFS+2τ+2α) followed by the detection of the last dominant (step S28). It should be noted that the ECU 3 performs the message re-sending operation after the predetermined period (tEOF+tIFS+2τ+2α) referred as the waiting time, although the gateway 1 performs the message re-sending operation after the predetermined period (tEOF+tIFS) referred as the waiting time (see step S8 in the FIG. 11). The waiting time of the ECU 3 is longer than the waiting time of the gateway 1, because (tEOF+tIFS+2τ+2α)>(tEOF+tIFS). It should be noted that the communication control unit 36 of the ECU 3 does not perform the re-sending operation in the case of receiving a message from the gateway 1 during the predetermined time (tEOF+tIFS+2τ+2α) for waiting until re-sending at the step S28.

When detecting no dominant within the predetermined period (7 bits) (S26: NO), the communication control unit 36 further checks whether a dominant is detected within the predetermined period (tEOF+tIFS+2τ+α) (step S29). When the communication control unit 36 detects a dominant within the predetermined period (tEOF+tIFS+2τ+α) (S29: YES), it is considered that the receipt response from the gateway 1 is obtained. Thus, the communication control unit 36 receives the message from the gateway 1 (step S30) and then completes the procedure. When the communication control unit 36 detects no dominant within the predetermined period (tEOF+tIFS+2τ+α) (S29: NO), it is considered that the message sending operation performed by the communication control unit 36 of the ECU 3 collides with the message sending operation performed by the gateway 1, or that the gateway 1 has not received the message. Thus, the communication control unit 36 performs the message re-sending operation (step S31) after the predetermined period (2τ+α). It should be noted that the ECU 3 performs re-sending operation after the predetermined period (2τ+α), although the gateway 1 performs the re-sending operation as soon as the determination is completed (see Step S10 shown by FIG. 12). Therefore, the waiting time of the ECU 3 is longer than the waiting time of the gateway 1.

FIG. 15, FIG. 16, FIG. 17 and FIG. 18 are schematic views showing examples of message re-sending operation performed by the communication system mountable on a car according to the present invention.

EXAMPLE 1

Figure 15:
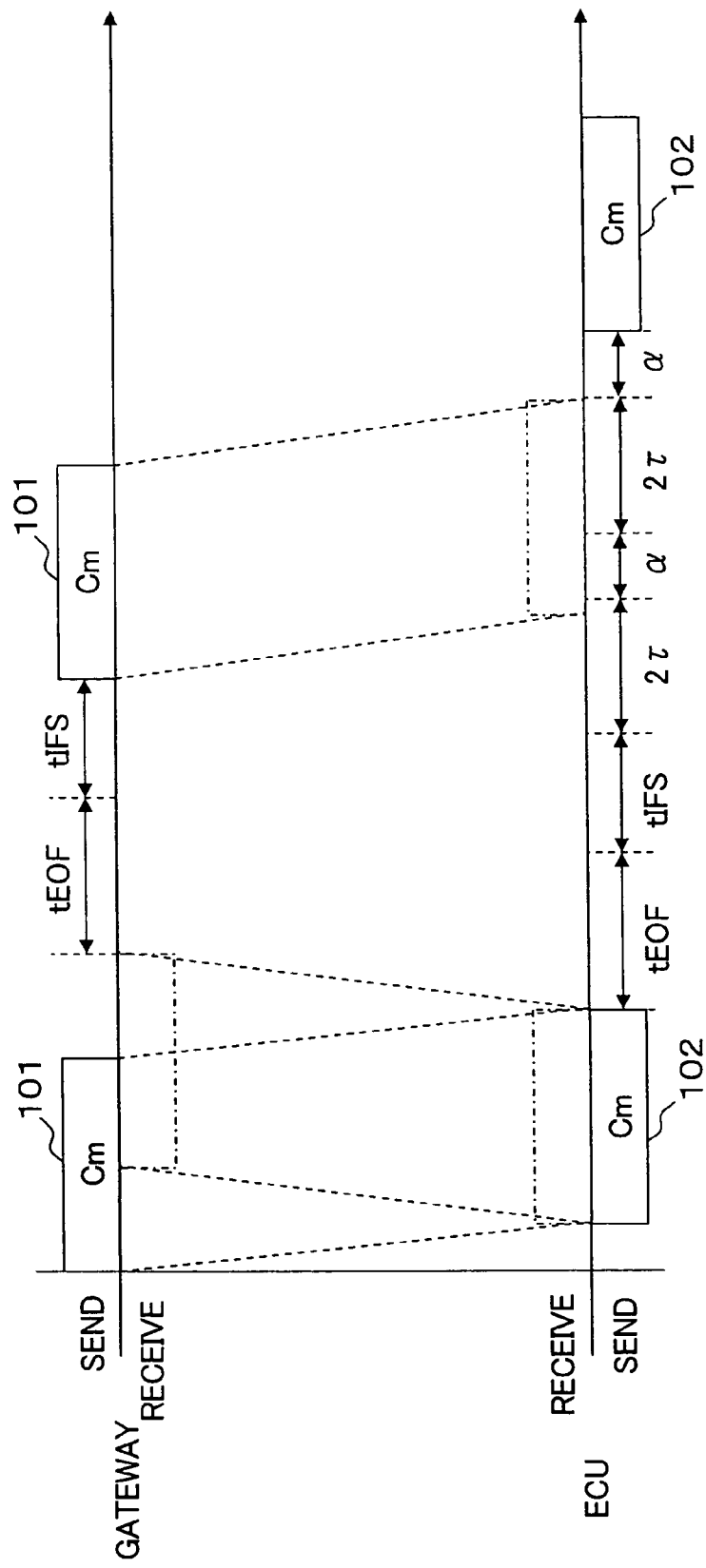
FIG. 15 is a schematic view showing an example of message re-sending operation performed by the communication system mountable on a car according to the present invention.

The Case that the Gateway 1 Detects a Collision (See FIG. 15)

For example, it is assumed that the gateway 1 sends a message 101 as the data frame to the ECU 3, and that the ECU 3 sends a message 102 to the gateway 1 before receiving the message 101. In this assumption, the communication control unit 14 of the gateway 1 starts monitoring the communication line 7 after the completion of sending the message 101, and detects a dominant within 7 bits (within tEOF+tIFS−α). Thus, the communication control unit 14 of the gateway 1 can detect the occurrence of massage sending collision, and performs the re-sending operation of the message 101 after the predetermined period (tEOF+tIFS) followed by the reception of the last dominant in the message 101 from the ECU 3 (the CRC delimiter in the message 101). When detecting a dominant during the period of the inter frame space, the communication control unit 14 of the gateway 1 sets a overload flag to be a dominant in the ACK field of the message to be re-sent, in order to inform the ECU 3 of the overload.

The communication control unit 36 of the ECU 3 waits the receipt response from the gateway 1 during the predetermined period (tEOF+tIFS+2τ+α), because the communication control unit 36 cannot detect the message collision. When receiving the receipt response within this period, the communication control unit 36 receives the message 101 that is re-sent together with this receipt response. When receiving no receipt response within this period (tEOF+tIFS+2τ+α), the communication control unit 36 waits for a further predetermined period (2τ+α) to re-send the message 102.

EXAMPLE 2

Figure 16:
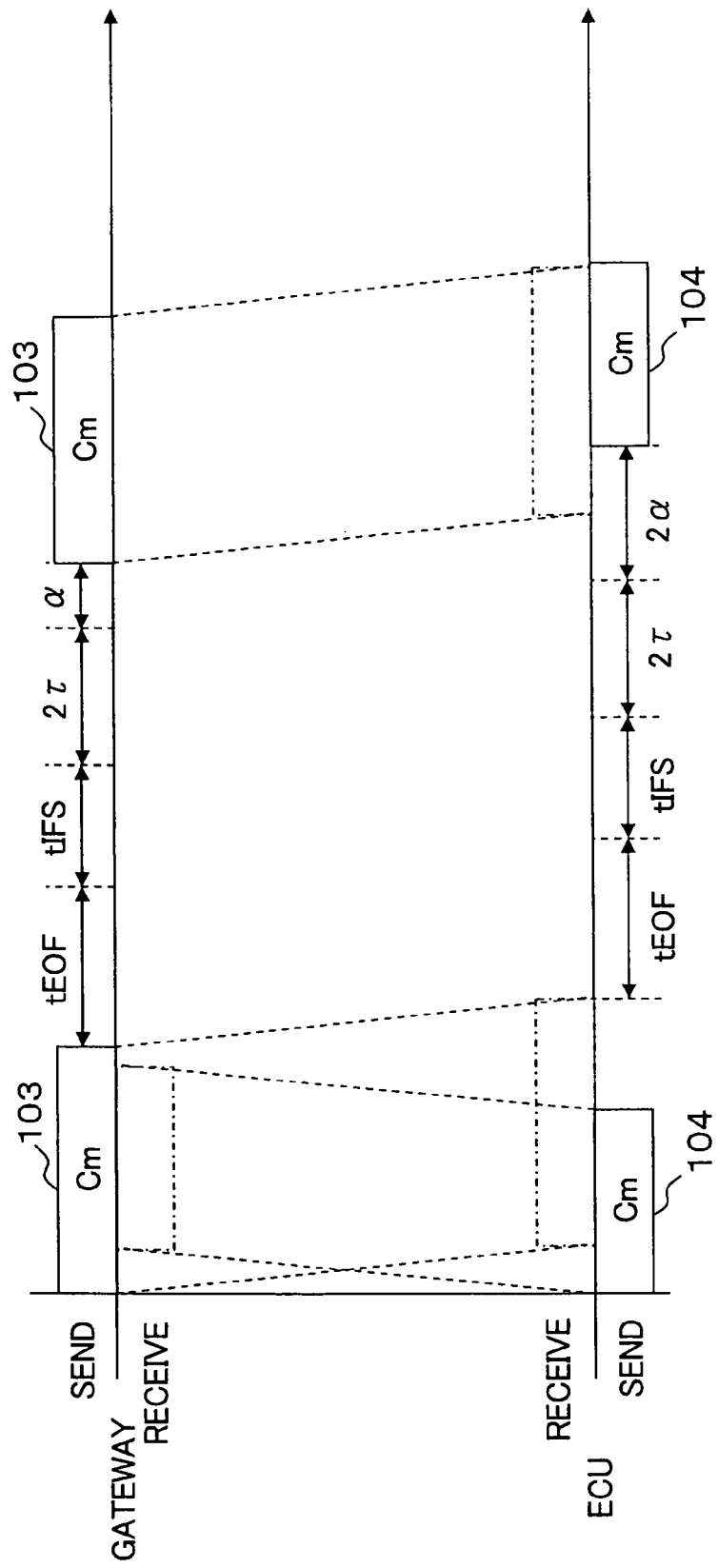
FIG. 16 is a schematic view showing an example of message re-sending operation performed by the communication system mountable on a car according to the present invention.

The Case that the ECU 3 Detects a Collision (See FIG. 16)

For example, it is assumed that the communication control unit 14 of the gateway 1 sends a message 103 as the data frame to the ECU 3 and that the communication control unit 36 of the ECU 3 sends a message 104 as the data frame at the same time to the gateway 1. In addition, it is assumed that the bit length of the message 103 is longer than the bit length of the message 104. In these assumptions, the communication control unit 36 of the ECU 3 starts monitoring the communication line 7 after the completion of sending the message 104, and detects a dominant within 7 bits, while the communication control unit 14 of the gateway 1 cannot detect a dominant.

The communication control unit 14 of the gateway 1 waits the receipt response with respect to the message 103 from the ECU 3 during the predetermined period (tEOF+tIFS+2τ+α), and then re-sends the message 103. On the other hand, the communication control unit 36 of the ECU 3 re-sends the message 104 after the predetermined period (tEOF+tIFS+2τ+2α) followed by the reception of the last dominant of the message 103 from the gateway 1 in order to detect the message collision. When receiving the message 103 from the gateway 1 during the predetermined period (tEOF+tIFS+2τ+2α), the communication control unit 36 performs the receiving operation of the message 103.

Thus, after the completion of receiving the message 103 firstly being sent from the gateway 1 (the collided message 103), the communication control unit 36 of the ECU 3 can receive the message 103 that is re-sent from the gateway 1 after the period (tEOF+tIFS+2τ+α). Therefore, the communication control unit 36 of the ECU 3 is configured to provide additional time α as a margin to the message re-sending period, and performs the re-sending operation after the period (tEOF+tIFS+2τ+2α).

EXAMPLE 3

Figure 17:
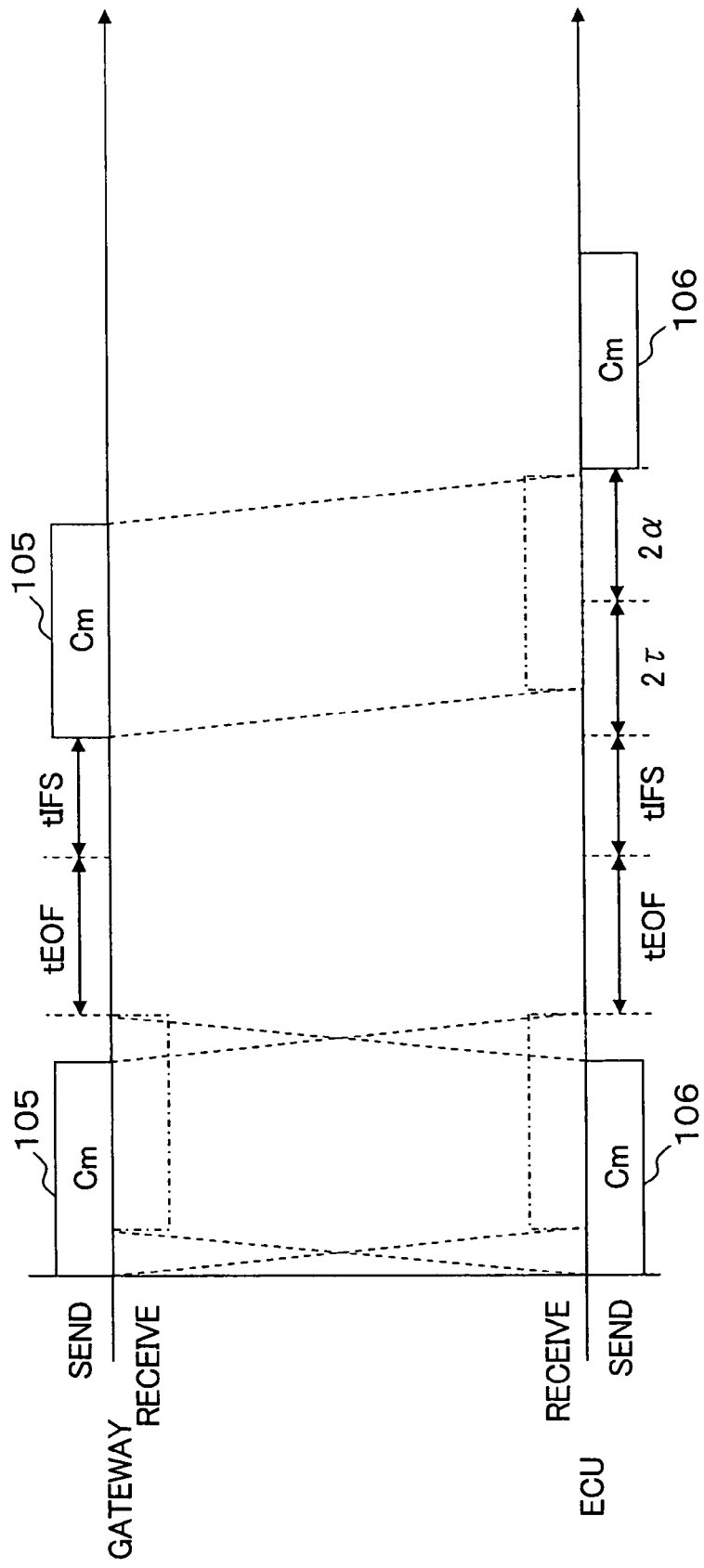
FIG. 17 is a schematic view showing an example of message re-sending operation performed by the communication system mountable on a car according to the present invention.

The Case that the Gateway 1 and the ECU 3 Detect a Collision (see FIG. 17)

For example, it is assumed that the communication control unit 14 of the gateway 1 sends a message 105 as the data frame to the ECU 3, and that the communication control unit 36 of the ECU 3 sends a message as the data frame at the same time to the gateway 1. In addition, it is assumed that the bit length of the message 105 is almost the same as the bit length of the message 106 and large amounts of the propagation delay are generated in the communication between the gateway 1 and the ECU 3. In these assumptions, the communication control unit 14 can detect a dominant within 7 bits after the completion of sending the message 105, and the communication control unit 36 of the ECU 3 can detect a dominant within 7 bits after the completion of sending the message 106. Thus, the gateway 1 and the ECU 3 can detect the message collision.

The communication control unit 14 of the gateway 1 re-sends the message 105 after the predetermined period (tEOF+tIFS) followed by the reception of the last dominant in the message 106 from the ECU 3. The communication control unit 36 of the ECU 3 re-sends the message 106 after the predetermined period (tEOF+tIFS+2τ+2α) followed by the reception of the last dominant in the message 105 from the gateway 1 in order to detect the message collision. When receiving the message 105 from the gateway 1 during the predetermined period (tEOF+tIFS+2τ+2α), the communication control unit 36 performs the receiving operation of the message 105.

Thus, the communication control unit 36 of the ECU 3 can receive the re-sent massage 105 from the gateway 1 after the period (tEOF+tIFS) before passing additional 2τ time, followed by the completion of receiving the message 105 firstly being sent from the gateway 1. It should be noted that the communication control unit 36 of the ECU 3 is configured to provide additional time 2α as a margin to the message re-sending period, and performs the re-sending operation after the period (tEOF+tIFS+2τ+2α).

EXAMPLE 4

Figure 18:
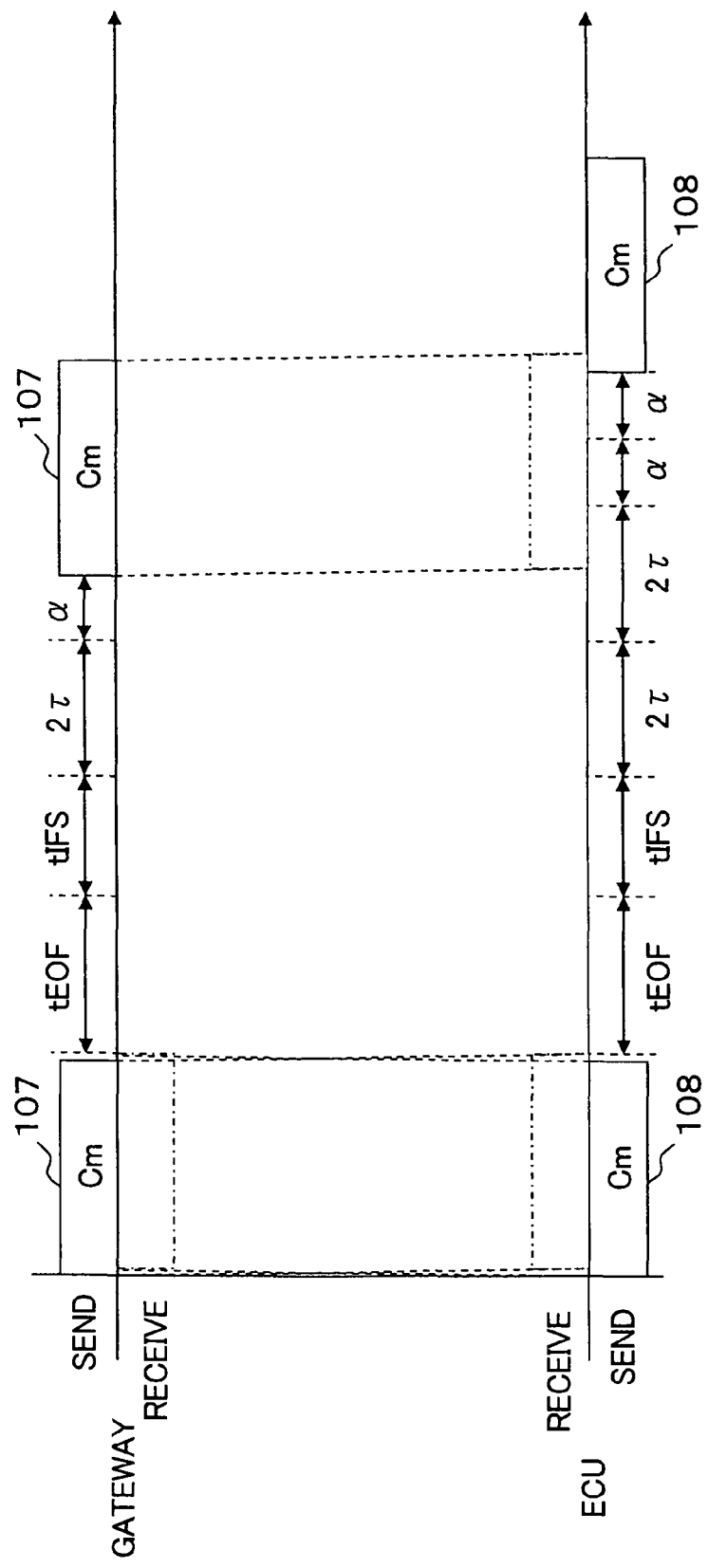
FIG. 18 is a schematic view showing an example of message re-sending operation performed by the communication system mountable on a car according to the present invention.

The Case that the Gateway 1 and the ECU 3 Cannot Detect a Collision (See FIG. 18)

For example, it is assumed that the communication control unit 14 of the gateway 1 sends a message 107 as the data frame to the ECU 3, and that the communication control unit 36 of the ECU 3 sends a message 108 as the data frame at the same time to the gateway 1. In addition, it is assumed that the bit length of the message 107 is almost the same as the bit length of the message 108 and a few amounts of the propagation delay are generated in the communication between the gateway 1 and the ECU 3. In these assumptions, the communication control unit 14 of the gateway 1 cannot detect a dominant within 7 bits after the completion of sending the message 107, and the communication control unit 36 of the ECU 3 cannot detect a dominant within 7 bits after the completion of sending the message 108. Thus, the gateway 1 and the ECU 3 cannot detect the message collision.

The communication control unit 14 of the gateway 1 waits for the receipt response from the ECU 3 with respect to the message 107 during the predetermined period (tEOF+tIFS+2τ+α) followed by the completion of sending the message 107, and re-sends the message 107. The communication control unit 36 of the ECU 3 waits for the receipt response from the gateway 1 with respect to the message 108 during the predetermined period (tEOF+tIFS+2τ+α) followed by the completion of sending the message 108. Only when receiving no message 107 from the gateway 1 during this period, the communication control unit 36 waits during additional (2τ+α) time, and then re-sends the message 108.

The operations are performed, such as the detecting operation of the message collision and the re-sending operation of the message, on the basis of procedures shown by the flowcharts in FIG. 11, FIG. 12, FIG. 13 and FIG. 14, as described in the above examples. Thus, it is possible to prefer the message re-sending operation of the gateway 1 when the message collision is generated. These configurations are implemented by the waiting time for the re-sending operation of the communication control unit 14 of the gateway 1 being set to be shorter than the waiting time of the communication control unit 36 of the ECU 3.

Figure 19:
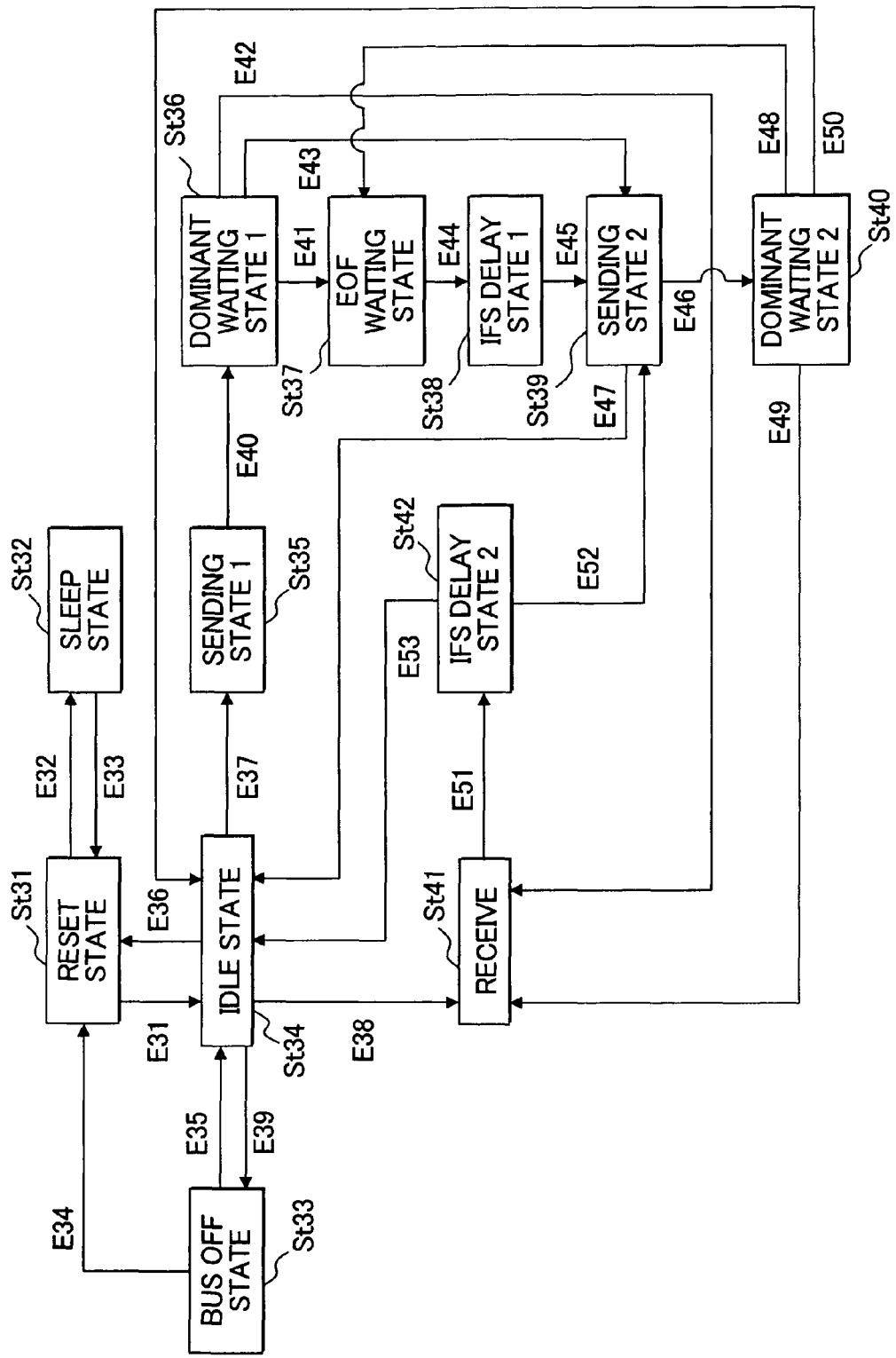
FIG. 19 is a state-transition diagram illustrating one example of detailed communication control of the gateway of the communication system mountable on a car according to the present invention.

Next, it will be described about a detailed communication control including the operations described above, such as the detecting operation of the message collision and the re-sending operation of the message. FIG. 19 is a state-transition diagram illustrating one example of detailed communication control of the gateway 1 of the communication system mountable on a car according to the present invention. FIG. 20 and FIG. 21 are state-transition tables illustrating one example of detailed communication control of the gateway 1 of the communication system mountable on a car according to the present invention. It should be noted that the state-transition shown by the FIG. 19, FIG. 20 and FIG. 21 is one configuration example in order to implement the message transmission performed by the method described above. Thus, the present invention is not limited to the configuration example. The communication control unit 14 of the gateway 1 is configured to change into twelve states: a reset state (St 31), sleep state (St 32), bus off state (St 33), idle state (St 34), sending state 1 (St 35), dominant waiting state 1 (St 36), EOF waiting state (St 37), IFS delay state 1 (St 38), sending state 2 (St 39), dominant waiting state 2 (St 40), receiving state (St 41) and a IFS delay state 2 (St 42), to perform the communication control.

The reset state (St 31) according to the state-transition of the communication control unit 14 of the gateway 1 is an initial state of the communication control unit 14 for performing an initialization operation of the hardware. The communication control unit 14 is configured to change from the reset state (St 31) into the idle state (St 34), when being provided a reset cancel request by the control unit 11 (event E31). In addition, the communication control unit 14 is configured to change from the reset state (St 31) into the sleep state (St 32), when being provided a sleep request by the control unit 11 (event E32).

In the sleep state (St 32), the operation of the communication control unit 14 is stopped and the consumed electric power is reduced. The communication control unit 14 is configured to change from the sleep state (St 32) into the reset state (St 31), when being provided a sleep cancel request by the control unit 11 (event E33).

In the bus off state (St 33), the communication control unit 14 cannot perform the message transmission via the communication line 7. The communication control unit 14 is configured to change from the bus off state (St 33) into the reset state (St 31), when being provided a reset request by the control unit 11 (event E34). Further, the communication control unit 14 monitors the communication line 7 in the bus off state (St 33). The communication control unit 14 is configured to change from the bus off state (St 33) into the idle state (St 34), when detecting sequential 11 bits recessives 128 times and obtaining an established reversion condition (event E35). When the communication control unit 14 changes from the bus off state (St 33) into the idle state (St 34), the TEC value and the REC value are initialized to be 0.

In the idle state (St 34), the communication control unit 14 has no message to be sent, monitors the communication line 7 and waits for receiving a message being sent from the ECU 3. The communication control unit 14 is configured to change from the idle state (St 34) into the reset state (St 31), when being provided a reset request by the control unit 11 (event E36). The communication control unit 14 is configured to change from the idle state (St 34) into the sending state 1 (St 35), when being provided a message sending request by the control unit 11 (event E37). In addition, the communication control unit 14 is configured to change from the idle state (St 34) into the receiving state (St 41), when receiving a message from the ECU 3 (event E38). Further, the communication control unit 14 is configured to change from the idle state (St 34) into the bus off state (St 33), when having the value of the error counter TEC or REC no less than 128 and obtaining an established bus off condition (event E38).

In the sending state 1 (St 35), the communication control unit 14 sends a message until the CRC delimiter of the data frame, remote frame or the ACK frame. The communication control unit 14 is configured to change from the sending state 1 (St 35) into the dominant waiting state 1 (St 36), when having sent the message until the CRC delimiter (event E40).

In the dominant waiting state 1 (St 36), the communication control unit 14 monitors the communication line 7 and waits for a generation of dominant after sending the CRC delimiter of the sending message. It is considered that a message collision is generated when a dominant is detected during a predetermined period (7 bits) followed by sending the CRC delimiter (event E41). Thus, the communication control unit 14 is configured to change from the dominant waiting state 1 (St 36) into the EOF waiting state (St 37), at that time. In addition, it is considered that a normal message is received when no dominant is detected during a predetermined period (7 bits) followed by sending the CRC delimiter but a dominant is detected during the predetermined period (tEOF+ tIFS+2τ+α) (event E42). Thus, the communication control unit 14 is configured to change from the dominant waiting state 1 (St 36) into the receiving state (St 41), at that time. Further, it is considered that no receipt response from the ECU 3 is obtained and that a message re-sending operation is required to be performed, when no dominant is detected during the predetermined period (tEOF+tIFS+2τ+α) followed by sending the CRC delimiter (event E43). Thus, the communication control unit 14 is configured to change from the dominant waiting state 1 (St 36) into the sending state 2 (St 39), at that time.

In the EOF waiting state (St 37), the communication control unit 14 keeps waiting, until the passage of the EOF period followed by the completion of the message sending operation performed by the ECU 3. The communication control unit 14 is configured to change from the EOF waiting state 1 (St 37) into the IFS delay state 1 (St 38), after the EOF period (event E44).

In the IFS delay state 1 (St 38), the communication control unit 14 keeps waiting until the passage of the inter frame space period. The communication control unit 14 is configured to change from the IFS delay state 1 (St 38) into the sending state 2 (St 39), after the inter frame space period.

In the sending state 2 (St 39), the communication control unit 14 is sending a message during performing transmission operations of the message together with the receipt response alternately between the communication control unit 14 and the ECU 3, or is re-sending the message due to the generated collision of message sending. The communication control unit 14 is configured to change from the sending state 2 (St 39) into the dominant waiting state 2 (St 40), when having a message to be sent to the ECU 3 after the completion of sending message (event E46). Further, the communication control unit 14 is configured to change from the sending state 2 (St 39) into the idle state (St 34), when having no message to be sent to the ECU 3 after the completion of sending message (event E47).

In the dominant waiting state 2 (St 40), the communication control unit 14 monitors the communication line 7 and waits for the generation of a dominant after sending the CRC delimiter of the sending message. The communication control unit 14 is configured to change from the dominant waiting state 2 (St 40) into the EOF waiting state (St 37), when detecting a dominant during a predetermined period (7 bits) followed by sending the CRC delimiter (event E48). Further, the communication control unit 14 is configured to perform an increment on the error counter and to change from the dominant waiting state 2 (St 40) into the receiving state (St 41), when no dominant is detected during a predetermined period (7 bits) followed by sending the CRC delimiter but a dominant is detected during the predetermined period (tEOF+tIFS+2τ+ α) (event E49). Further, it is considered that no receipt response from the ECU 3 is obtained, when no dominant is detected during the predetermined period (tEOF+tIFS+2τ+ α) followed by sending the CRC delimiter (event E50). Thus, the communication control unit 14 is configured to perform an increment on the error counter and to change from the dominant waiting state 2 (St 40) into the idle state (St 34), at that time.

In the receiving state (St 41), the communication control unit 14 is receiving a message from the ECU 3. The communication control unit 14 is configured to change from the receiving state (St 41) into the IFS delay state 2 (St 42), when completing a message receiving operation (event E51).

In the IFS delay state 2 (St 42), the communication control unit 14 keeps waiting, until the passage of the inter frame space period followed by receiving the data frame, remote frame or the ACK frame. When having a receipt response to be sent in this state, the communication control unit 14 has to send the receipt response to the ECU 3 after the inter frame space period (event E52). Thus, the communication control unit 14 is configured to change from the IFS delay state 2 (St 42) into the sending state 2 (St 39), at that time. In addition, the communication control unit 14 is configured to change from the IFS delay state 2 (St 42) into the idle state (St 34) after the inter frame space period (event E53), when having no receipt response to be sent.

Figure 22:
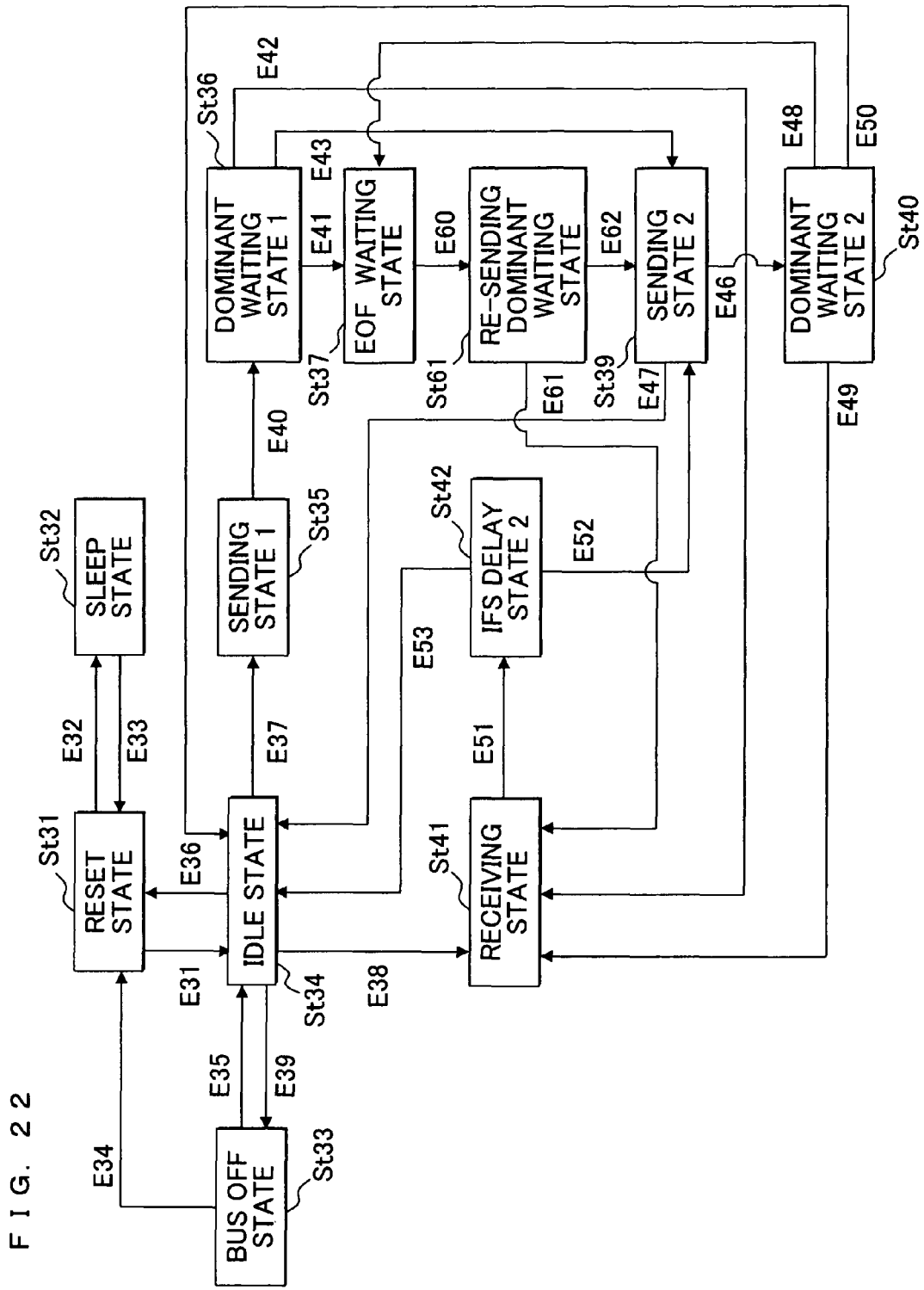
FIG. 22 is a state-transition diagram illustrating one example of detailed communication control of the ECU of the communication system mountable on a car according to the present invention.

FIG. 22 is a state-transition diagram illustrating one example of detailed communication control of the ECU 3 of the communication system mountable on a car according to the present invention. FIG. 23 and FIG. 24 are state-transition tables illustrating one example of detailed communication control of the ECU 3 of the communication system mountable on a car according to the present invention. The state-transition of the communication control unit 36 of the ECU 3 is almost the same as the state-transition of the communication control unit 14 of the gateway 1 shown by FIG. 19, FIG. 20 and FIG. 21. Thus, it will be described about different configurations only. The communication control unit 36 of the ECU 3 utilizes a re-sending dominant waiting state (St 61), instead of the IFS delay state 1 (St 38) utilized by the communication control unit 14 of the gateway 1. In other words, the communication control unit 36 of the ECU 3 is configured to change from the EOF waiting state (St 37) into the re-sending dominant waiting state (St 61), after the EOF period in the EOF waiting state (St 37) (event E60).

In the dominant waiting state 1 (St 36), the communication control unit 36 monitors the communication line 7 and waits for the generation of a dominant after sending the CRC delimiter of the sending message. It is considered that a message collision is generated when a dominant is detected during a predetermined period (7 bits) followed by sending the CRC delimiter (event E41). Thus, the communication control unit 36 is configured to change from the dominant waiting state 1 (St 36) into the EOF waiting state (St 37), at that time. In addition, it is considered that a normal message is received when no dominant is detected during a predetermined period (7 bits) followed by sending the CRC delimiter but a dominant is detected during the predetermined period (tEOF+ tIFS+4τ+2α) (event E42). Thus, the communication control unit 36 is configured to change from the dominant waiting state 1 (St 36) into the receiving state (St 41), at that time. Further, it is considered that no receipt response from the gateway 1 is obtained and that a message re-sending operation is required to be performed, when no dominant is detected during the predetermined period (tEOF+tIFS+4τ+ 2α) followed by sending the CRC delimiter (event E43). Thus, the communication control unit 36 is configured to change from the dominant waiting state 1 (St 36) into the sending state 2 (St 39), at that time.

In the re-sending dominant waiting state (St 61), the communication control unit 36 of the ECU 3 waits for receiving a message being re-sent from the gateway 1 after sending a message to the gateway 1 in the case that a message collision is generated. It is considered that a message being re-sent from the gateway 1 is received when a dominant is detected during the predetermined period (tIFS+2τ+2α) followed by the EOF period (event E61). Thus, the communication control unit 36 is configured to change from the re-sending dominant waiting state (St 61) into the receiving state (St 41), at that time. Furthermore, it is considered that no message is re-sent from the gateway 1 and that a message re-sending operation is required to be performed by the communication control unit 36, when no dominant is detected during the predetermined period (tIFS+2τ+2α) (event E62). Thus, the communication control unit 36 is configured to change from the re-sending dominant waiting state (St 61) into the sending state 2 (St 39), at that time.

In the other states, the communication control unit 36 of the ECU 3 performs operations similarly to the communication control unit 14 of the gateway 1, although the relationships are reversed between the sending operations and the receiving operations. Thus, the description is omitted about the other states. The communication control unit 14 of the gateway 1 and the communication control unit 36 of the ECU 3 perform operations based on the state-transitions shown by FIG. 19 to FIG. 24. Therefore, it is possible to implement performing the alternate communication of the gateway 1 and the ECU 3, re-sending a message in a manner preferring the re-sending operation of the gateway 1 in the case that a sending message is collided, and the like.

In the communication system mountable on a car described above, the gateway 1 is connected to the ECU 3 in the one-to-one manner, and the receipt response (ACK frame) is returned to the sender of the received message. In addition, the receipt response is implemented to be sent together with the message. Thus, it is possible that the gateway 1 and the ECU 3 alternately send a message. Therefore, it is possible to prevent a message sending operation performed by either communication from being kept waiting continuously, even when both the gateway 1 and the ECU 3 have large numbers of message to be sent. Furthermore, the gateway 1 has a waiting time from the generation of message sending collision until a re-sending operation, which can be set shorter than the waiting time of the ECU 3. Thus, the message re-sending operation of the gateway 1 can be preferred, and the message re-sending operation of the ECU 3 can be performed together with sending a message to the gateway 1. Therefore, it is possible to prevent sequential generations of the sending message collision. For the reasons described above, the communication system mountable on a car according to the present invention can lead advantages to maximize the efficiency for utilizing the communication pathway between the gateway 1 and the ECU 3 in order to transmit a message, implement high speed communication, and to ensure performing operations that require a real time property, such as a cruise control operation for car.

Although it is described in the present embodiment about the communication between the gateway 1 and the ECU 3 of the communication system mountable on a car, these configurations can be applied similarly to the communication between two gateways 1. In this application, the waiting time of one gateway 1 for re-sending a message may be set differently from the waiting time of the other gateway 1. Further, although it is described in the present embodiment about the re-sending operation of the gateway 1 preferred rather than the re-sending operation of the ECU 3, the present invention is not limited to this configuration. The re-sending operation of the ECU 3 may be preferred rather than the re-sending operation of the gateway 1. Furthermore, although it is described about a configuration utilizing one maximum propagation delay time τ for the entire communication system mountable on a car, the present invention is not limited to this configuration. All the gateways 1 and the ECUs 3 may respectively utilize a different value of the maximum propagation delay time τ depending on the length of the communication line 7. Moreover, it is illustrated in FIG. 1 about one example configuration of the communication system mountable on a car, the present invention is not limited to this configuration. The numbers of the gateway 1 and the ECU 3 may be arbitrarily set for mounting on a car.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication system mountable on a car, comprising:
   a plurality of communication apparatuses that perform data transmission with each other, wherein
   one communication apparatus among the plurality of communication apparatuses comprises:
      a sending unit that sends data to another communication apparatus among the plurality of communication apparatuses; and
      a receiving unit that receives data from said another communication apparatus,
   the sending unit sends to said another communication apparatus a receipt response informing that the receiving unit receives data, when the receiving unit receives the data, and
   when said one communication apparatus has data to be sent to said another communication apparatus in a case that the sending unit sends the receipt response, the sending unit adds the data to be sent onto the receipt response and sends the data to be sent together with the receipt response to said another communication apparatus.

2. A communication system mountable on a car according to claim 1, further comprising:
   a plurality of communication lines, wherein
   said communication apparatus is connected to several communication apparatuses among the plurality of communication apparatuses; and
   said communication apparatus is connected to said another communication apparatus with one communication line of the plurality of communication lines, in an one-to-one manner.

3. A communication system mountable on a car according to claim 1, wherein
   the receipt response comprises information indicating whether the added data is identical to the data having already sent by the sending unit or not.

4. A communication system mountable on a car according to claim 1, wherein
   the receipt response comprises information indicating whether an error is included in the data received by the receiving unit or not.

5. A communication system mountable on a car according to claim 2, wherein
   said one communication apparatus comprises a determining unit that determines whether a collision is generated on the data sent by the sending unit,
   the sending unit re-sends the data sent by the sending unit after a predetermined waiting before sending period, when the determining unit determines that the collision is generated, and
   the waiting before sending period of said one communication apparatus is shorter than the waiting before sending period of said another communication apparatus.

6. A communication system mountable on a car according to claim 5, wherein
the determining unit determines that the collision is generated, when the receiving unit receives, during a predetermined determining period followed by sending data of the sending unit, data sent from said another communication apparatus.

7. A communication system mountable on a car according to claim 5, wherein
the sending unit re-sends the data sent by the sending unit after the waiting before sending period, when the receiving unit receives no receipt response from said another communication apparatus during a predetermined waiting before receiving period followed by sending data of the sending unit.

8. A communication apparatus mountable on a car, comprising:
a sending unit that sends data; and
a receiving unit that receives data, wherein
when the receiving unit receives data, the sending unit sends a receipt response informing that the receiving unit receives the data to a sender of the received data; and
when the communication apparatus has data to be sent to the sender in a case that the sending unit sends the receipt response, the sending unit adds the data to be sent onto the receipt response and sends the data to be sent together with the receipt response to the sender.

9. A communication method mountable on a car that performs data transmission between a plurality of communication apparatuses, comprising the steps of:
connecting one communication apparatus among the plurality of communication apparatuses to another communication apparatus among the plurality of communication apparatuses, with a communication line in an one-to-one manner;
sending a receipt response informing of the receipt of data to a sender of the data; and
adding data, which should be sent to the sender together with the receipt response, onto the receipt response, wherein
when said one communication apparatus receives data from said another communication apparatus, the receipt response is sent to said another communication apparatus, and
when said one communication apparatus has data to be sent to said another communication apparatus in a case that the receipt response is sent to said another communication apparatus, the data to be sent is added onto the receipt response and is sent to said another communication apparatus together with the receipt response.

* * * * *